US006650824B1

(12) United States Patent
Horlander et al.

(10) Patent No.: US 6,650,824 B1
(45) Date of Patent: Nov. 18, 2003

(54) SYSTEM AND METHOD FOR RECORDING ANALOG AND DIGITAL SIGNALS, AND FOR ERROR RECOVERY IN RECORDING

(75) Inventors: Karl Francis Horlander, Indianapolis, IN (US); Michael Francis Kvintus, Jr., Terre Haute, IN (US); Keith Reynolds Wehmeyer, Hamilton, IN (US); Robert Howard Miller, Leawood, KS (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/271,971

(22) Filed: Mar. 18, 1999

Related U.S. Application Data

(62) Division of application No. 09/117,278, filed on Jan. 31, 1997, now Pat. No. 6,507,953.
(60) Provisional application No. 60/011,023, filed on Feb. 2, 1996, provisional application No. 60/015,035, filed on Apr. 8, 1996, and provisional application No. 60/028,651, filed on Oct. 16, 1996.

(51) Int. Cl.[7] .................................................. H04N 5/76
(52) U.S. Cl. ............................ 386/46; 386/94; 386/124
(58) Field of Search .............................. 386/35, 40, 1, 386/46, 124, 94; 360/32, 60, 61–64; 380/201, 203; H04N 5/76, 5/92, 9/79

(56) References Cited

U.S. PATENT DOCUMENTS

| 4,808,992 | A | | 2/1989 | Beyers, Jr. et al. | 340/825 |
|---|---|---|---|---|---|
| 4,855,730 | A | | 8/1989 | Venners et al. | 340/825 |
| 5,179,451 | A | | 1/1993 | Takeshita et al. | 358/335 |
| 5,307,171 | A | | 4/1994 | Azuma et al. | 358/335 |
| 5,315,448 | A | | 5/1994 | Ryan | 360/60 |
| 5,335,125 | A | | 8/1994 | Nakatsu et al. | 360/10.3 |
| 5,418,853 | A | | 5/1995 | Kanota et al. | 380/5 |
| 5,548,410 | A | * | 8/1996 | Kim et al. | 360/32 |
| 5,619,732 | A | * | 4/1997 | Yoneyama | 360/27 |
| 5,841,941 | A | * | 11/1998 | Morimoto et al. | 386/124 |
| 6,339,676 | B1 | * | 1/2002 | Amada et al. | 386/124 |
| 2001/0041043 | A1 | * | 11/2001 | Abe et al. | 386/39 |

FOREIGN PATENT DOCUMENTS

AU          605458      7/1991    ............ H04B/3/54

(List continued on next page.)

OTHER PUBLICATIONS

IEEE Communications Magazine, vol. 31, No. 10, Oct. 1, 1993, C. Douligeris, "Intelligent Home Systems", pp. 52–61.

(List continued on next page.)

Primary Examiner—Thai Tran
(74) Attorney, Agent, or Firm—Joseph S. Tripoli; Paul P. Kiel

(57) ABSTRACT

A method for operating a video recording apparatus in one of a digital recording mode and an analog recording mode. The method involves recording a digital video bit stream in the digital recording mode and switching to the analog recording mode for recording the corresponding analog video signal in response to a fault condition. For example, the fault conditions may occur in response to improper copyright information, an analog recording media being loaded into the video recording apparatus or the digital video bit stream being absent while the video recording apparatus operates in the digital recording mode. The fault condition may be indicated to a user and switching to a different mode, such as the analog recording mode, may occur in response to receiving a user initiated command responsive to the indicated fault condition.

15 Claims, 15 Drawing Sheets

FOREIGN PATENT DOCUMENTS

| EP | 0382296 | | 8/1990 | ........... H04N/7/167 |
|----|---------|----|--------|-----------------------|
| EP | 0488337 | A2 | 6/1992 | ............ H04N/9/79 |
| EP | 0498617 | A2 | 8/1992 | ............ H04N/5/91 |
| EP | 0574892 | A2 | 12/1993 | ............ H04N/9/80 |
| EP | 0580367 | A2 | 1/1994 | ........... H04N/7/087 |
| EP | 0581227 | A2 | 2/1994 | ............ H04N/5/92 |
| EP | 0606180 | A2 | 7/1994 | ............ H04N/5/92 |
| EP | 0651588 | | 5/1995 | ............ H04Q/11/04 |
| JP | 7-111634 | | 4/1995 | ............ H04N/5/92 |
| JP | 8-087785 | | 4/1996 | ......... G11B/15/087 |

OTHER PUBLICATIONS

RCA Engineer, 30–4 Jul./Aug. 1985, R.A. Pitsch, "Dimensia: The Next Dimension of Sight and Sound", pp. 66–70.

IEEE 1997, M. Sasamoto et al., "D–VHS VCR for the Digital Broadcast System", pp. 15–18.

European Search Report listing the above–cited references AA and AM.

* cited by examiner

SYSTEM AND METHOD FOR RECORDING ANALOG AND DIGITAL SIGNALS, AND FOR ERROR RECOVERY IN RECORDING

This is a division of application Ser. No. 09/117,278 filed on Jan. 31, 1997, now U.S. Pat. No. 6,507,953.

This appplication claims the benefit of provisional application 60/028,651, filed Oct. 16, 1996, 60/015,035, filed Apr. 8, 1996, and 60/011,023, filed Feb. 27, 1997.

FIELD OF THE INVENTION

The Invention involves systems for communicating between multiple electronic devices, such as consumer electronic devices, via interconnections such as digital data buses.

BACKGROUND

Data bus protocols such as the Consumer Electronics Bus, or CEBus, can be utilized for interconnecting consumer electronics devices such as television receivers, display devices, video-cassette recorders (VCR), and direct broadcast satellite (DBS) receivers. A bus protocol such as the CEBUS provides for communicating both control information and data. CEBus control information is communicated on a "control channel" having a protocol defined in Electronics Industries Association (EIA) specification IS-60. Control information for a particular application can be defined using a form of programming language known as CAL (Common Application Language).

Consumer electronics devices are becoming increasingly complex and provide an ever-increasing number of features. While coupling these complex devices together via a data bus may be necessary to provide a complete audio-video (A/V) system, doing so creates numerous problems. For example, certain features of one device may require interaction with one or more devices coupled to the bus. A capability of one device may be needed to complete a particular operation in another device. Conflicts between the needs of various devices may arise.

A specific example of an A/V system involving complex electronic devices coupled via a data bus is a system that includes a digital VHS format (DVHS) VCR, such as that being developed by Thomson Consumer Electronics, Inc., of Indianapolis, Ind., and a DSS® satellite receiver, manufactured by Thomson Consumer Electronics, Inc. The DVHS VCR can record either analog or digital signals. Various checks must occur before a recording can occur. For example, is the proper type of tape (analog or digital) loaded in the VCR? Is the user entitled to record a particular program: is the copyright status such that recording is permitted and has the user paid any fees required? Is the DSS® unit available to tune the desired program at the time a recording is to be made? Is the DSS® unit tuning the desired channel? In addition, a user must be informed, e.g., using on-screen display (OSD) messages, regarding the status of each device and what operations each device is performing. The complexity of each device and of the interactions involved creates a need for a robust system and method for communicating information between interconnected electronics devices.

SUMMARY OF THE INVENTION

The invention resides, in part, in recognizing the described problems and, in part, in providing a system and method for solving these problems. Generally, the present invention defines a method for operating a video recording apparatus in one of a digital recording mode and an analog recording mode. Particularly, the method comprises receiving either a digital video bit stream for recording in the digital recording mode or a corresponding analog video signal for recording in the analog recording mode, recording the digital video bit stream in the digital recording mode; and switching to the analog recording mode for recording the corresponding analog video signal in response to a fault condition.

In accordance with another aspect of the present invention the digital video bit stream includes copyright information and the step of switching to the analog recording mode occurs in response to the copyright information.

In accordance with another aspect of the present invention switching to the analog recording mode occurs in response to an analog recording media being loaded into the video recording apparatus.

In accordance with another aspect of the present invention switching to the analog recording mode occurs in response to the digital video bit stream being absent while the video recording apparatus operates in the digital recording mode.

In accordance with still another aspect of the present invention, the method also comprises indicating the fault condition to a user and the step of switching to the analog recording mode occurs in response to receiving a user initiated command responsive to the indicated fault condition. Further, the method also comprises canceling the digital recording in response to receiving a user initiated command responsive to said indicated fault condition.

In accordance with still another aspect of the present invention, the recording apparatus is initialized to operate in a delay operating mode in response to a predetermined event for a second program and the recording apparatus pre-empts the recording of a first program to record the second program.

In accordance with yet another aspect of the present invention, a method of error recovery for a video recording apparatus capable of recording in one of a digital recording mode and an analog recording mode comprises initializing the video recording apparatus to operate in a delay operating mode, receiving either a digital video bit stream for recording in the digital recording mode or a corresponding analog video signal for recording in the analog recording mode, recording the digital video bit stream in the digital recording mode in response to first copyright information received from an electronic program guide, and switching to the analog recording mode for recording the corresponding analog video signal in response to second copyright information received in the digital video bit stream.

In accordance with yet another aspect of the present invention, the analog video signal and digital video bit stream are received from a receiver and the method also comprises disabling the generation of the digital video bit stream so the recording apparatus only receives said corresponding analog video signal. Recording may be canceled in response to a user's indication that an analog recording is not desired.

In accordance with yet another aspect of the present invention, the method also comprises indicating to a user that the event programmed in the delay operating mode may not be recorded because the first copyright information is not available or that because the video recording apparatus is presently operating in a playback mode.

In accordance with yet another aspect of the present invention, a method of operating a video recording apparatus in one of a digital recording mode and an analog recording mode comprises receiving either a digital video bit stream for recording in the digital recording mode or a corresponding analog video signal for recording in the analog recording mode, selecting the digital recording mode, detecting a no-fault condition or a fault condition of the video recording apparatus, recording the digital video bit stream in the digital recording mode in response to the no-fault condition, and switching from the digital recording mode to the analog recording mode for recording the corresponding analog video signal in response to the fault condition.

BRIEF DESCRIPTION OF THE DRAWING

The invention may be better understood by referring to the enclosed drawing in which.

DETAILED DESCRIPTION

Figure 1:
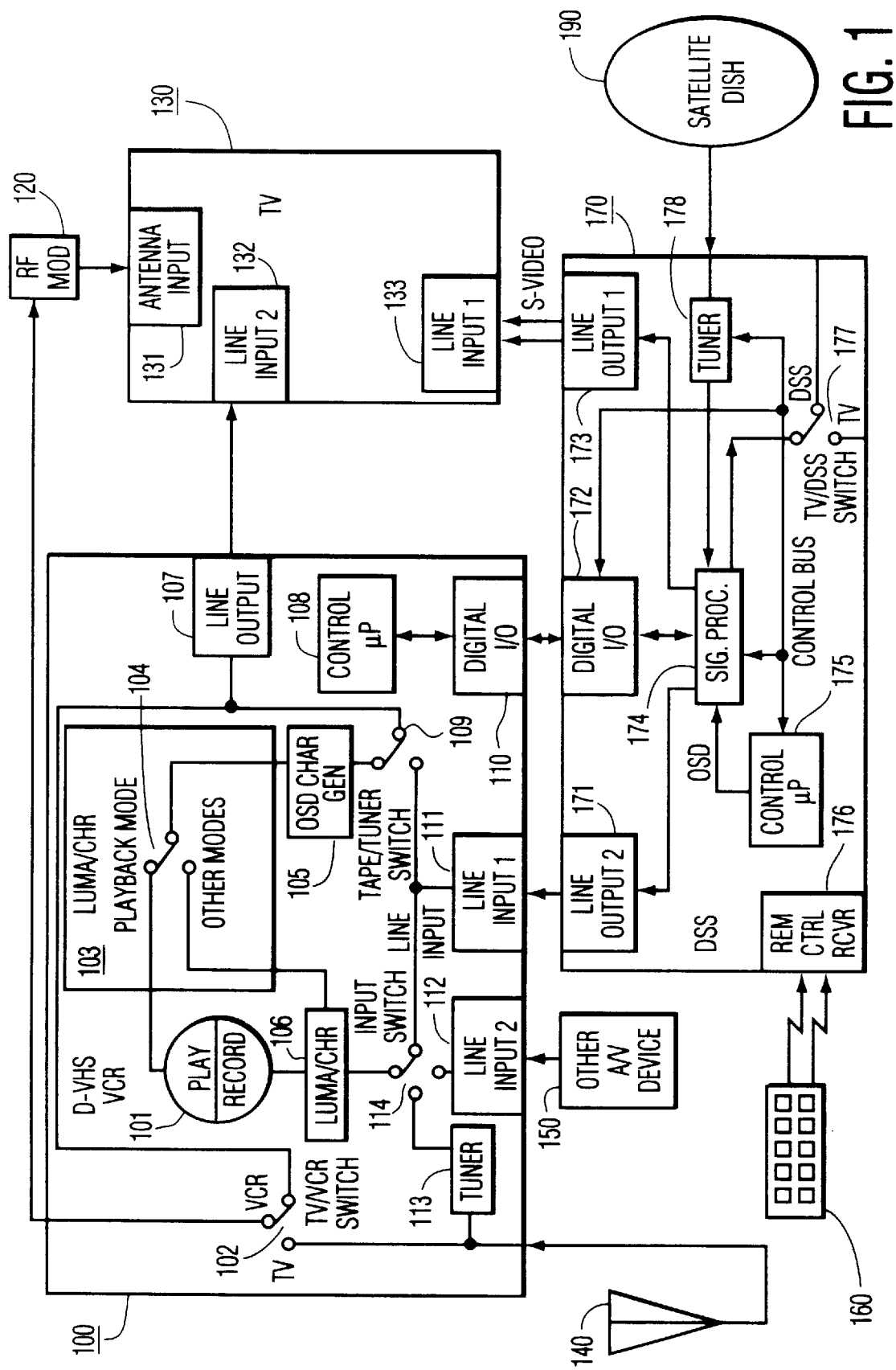
FIGS. 1–3 show, in block diagram form, several embodiments of systems constructed in accordance with principles of the invention.

FIG. 1 shows a system interfacing multiple electronic devices including D-VHS VCR 100, DSS unit 170, TV 130, another A/V device 150, antenna 140 for receiving broadcast signals, remote control 160 for providing a user interface to DSS unit 170, satellite dish antenna 190 for receiving DSS signals, and RF modulator 120. VCR 100 includes play/record circuitry 101 which receives signals to be recorded from luma/chroma processor 106. Circuitry 101 outputs signals during playback to luma/chroma processor 103. Processor 103 also includes switch 104 for routing signals during playback mode and during other modes as shown. VCR 100 also includes tuner 113 for tuning a desired channel from the signal produced by antenna 140 and line inputs 111 and 112 for receiving composite television signals from other A/V device 150 and line output 171 of DSS unit 170, respectively. Line output 107 of VCR 100 provides a composite television signal output to line input 132 of TV 130. Digital I/O to VCR 100 is provided via digital interface 110. On screen display (OSD) generator 105 produces signals representing user interface information, such as messages and status information, that can be coupled to TV 130 via switch 109 for display. Switches 102, 104, 109, and 114 provide for routing signals as need for each of the operating modes of VCR 100.

Also included in VCR 100 is control microprocessor ($\mu$P) 108 which is coupled to and controls functions within VCR 100, such as tuner 113, play/record unit 101 and the luma/chroma processors, via a bus internal VCR 100 (not shown in FIG. 1). Control $\mu$P 108 also controls the communication of control information to DSS unit 170 via digital I/O port 110. Digital A/V data is also communicated between VCR 100 and digital data port 172 of DSS unit 170. For example, programs received by DSS unit 170 can be recorded in digital form in response to a user requesting a digital recording by DSS unit 170 providing digital data for the program to VCR 100. Display of a digitally recorded program is accomplished during playback in VCR 100 by coupling the digital data produced by VCR 100 to port 172 of DSS unit 170 which proceeds to process the digital data and produce a composite television signal suitable for coupling to TV 130.

In addition to the features already described, DSS unit 170 includes tuner 178 for tuning a particular signal from the signals received by dish antenna 190. The output of tuner 178 is coupled to signal processing unit 174 which digitally processes the program signal and produces a variety of television signals. First, an S-video signal is produced and coupled to line output 173 which is coupled to line input 133 of TV 130. DSS unit 170 also produces a composite television signal which, as mentioned above, is coupled to VCR 100 via line output 171 of DSS 170. Remote control receiver 176 receives signals, such as infrared (IR) or RF signals from wireless remote 160. The remote control signals provide a user interface permitting a user to control DSS unit 170. Although not shown in FIG. 1, user interfaces such as remote control 160 could may also be provided for VCR 100 and TV 130.

Also included in DSS unit 170 is control $\mu$P 175 which is shown connected to various features of DSS unit 170 via a control bus. Microprocessor 175 produces OSD data for providing a visible display of user interface messages and information similarly to that produced by OSD generator 105 of VCR 100. Microprocessor 175 also controls features of DSS unit 170, including digital I/O port 172, in a similar manner to that described above in regard to VCR 100. In particular, as is explained in more detail below, control information communicated between VCR 100 and DSS unit 170 may include user interface information, such as OSD data, information regarding events scheduled in each device, and availability of resources.

The communication of such information allows either VCR 100 or DSS unit to check the status of the other device, obtain information regarding events scheduled in the other device, check for conflicts between events scheduled in DSS unit 170 and VCR 100 (for example, viewing of one program is scheduled in DSS unit 170 while programming of a different program is scheduled in VCR 100), and determine whether errors exist in the other device (e.g., an analog tape is loaded in VCR 100 when a digital recording is supposed to occur). Because either device can obtain such information from the other, either device can determine exception conditions (i.e., conflicts and errors) and can maintain a log of exception conditions that exist for one or both devices. The log can be provided to the user via OSD, for example, to inform the user of the status of the system.

In addition, one device can modify operations scheduled in another device that may involve an error or conflict in an effort to achieve the object of the original operation. For example, assume a user requests a digital recording, but loads an analog tape rather than a digital tape. Control processor 108 in VCR 100 will detect the error. However, control processor 175 in DSS unit 170 could also check the status of VCR 100 by sending appropriate commands to VCR 100 via the digital bus interface comprising digital I/O units 110 and 172. DSS unit 172 would then receive status information, could evaluate the information and detect the error, and could proceed to send appropriate commands to VCR 100 to modify the digital record operation to an analog record operation. Thus, while the user would not obtain a digital recording as desired, at least the user would have a recording of the program, thereby achieving at least part of the original object of the operation. A record of all such modifications of operations that occur in one, or both, devices could be maintained in one device and could be presented to a user, for example, in an OSD display, to inform the user of the changes.

Figure 2:
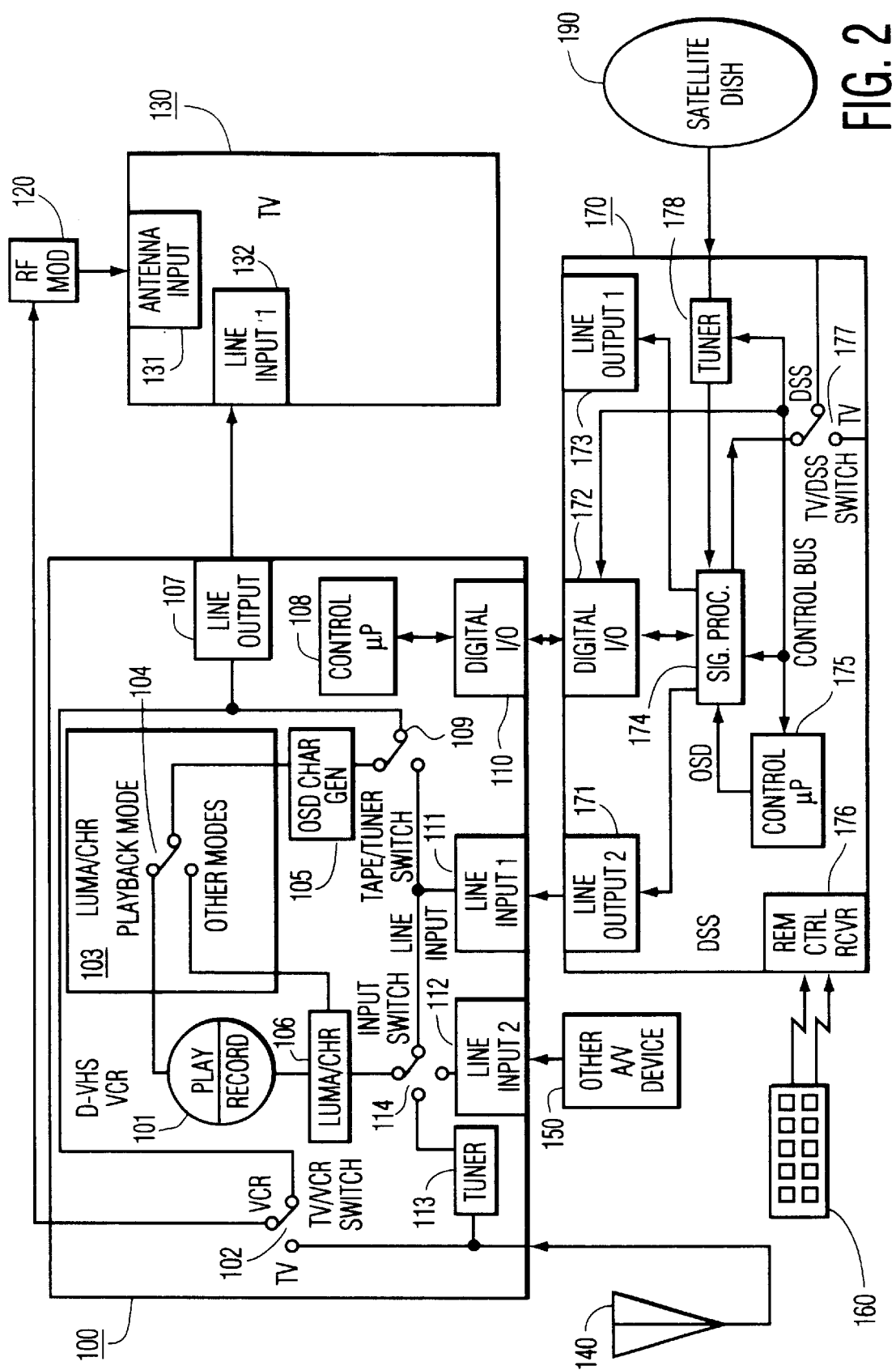
Figure 3:
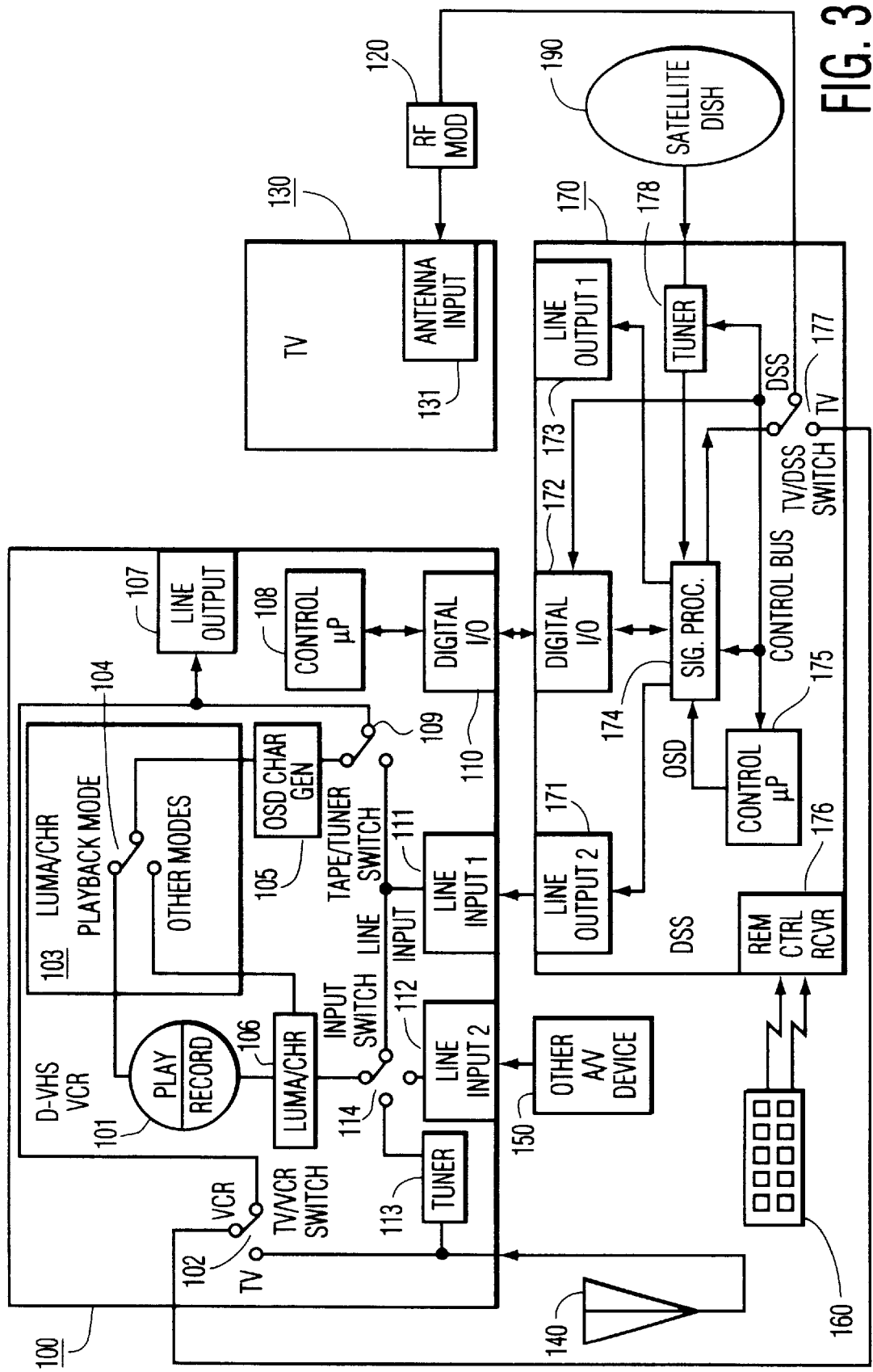

FIGS. 2 and 3 show variations of the system shown in FIG. 1. More specifically, FIG. 2 shows the manner in which the system would be connected if TV 130 has only one line input rather than two as in FIG. 1. In FIG. 2, rather than signals from DSS unit 170 being provided directly to TV 130 via line output 173 as in FIG. 1, the system in FIG. 2 couples the output of DSS unit 170 to line input 132 of TV 130 via line output 171 of DSS unit 170 and line input 111, switch 109, and line output 107 of TV 130. Other aspects of FIG. 2 are substantially the same as in FIG. 1 and will not be described again.

In FIG. 3, TV 130 has only an antenna input and no composite video inputs. As a result, the output of DSS unit 170 in FIG. 3 is routed to the antenna input of TV 130 via switch 177 of DSS unit 170 and RF modulator 120. Other aspects of the system shown in FIG. 3 are substantially the same as in FIGS. 1 and 2 and will not be described again.

Another aspect of the system shown in FIG. 1 involves security issues such as those involving operations requiring a password. For example, before purchase of a pay-per-view event is permitted, it may be necessary to enter a password. Similarly, a password may be needed before viewing of programs with certain ratings is permitted. Normally, a password for such operations would be entered in the DSS unit. However, recording a pay-per-view event or recording an event having a rating that is restricted also requires checking a password. That is, when a user requests recording of a program, VCR 100 sends a request to DSS unit 170 to schedule tuning of the correct program at the correct time. The request causes DSS unit 170 to check authorization information such as whether a password is needed for the particular operation.

As explained in more detail below, the system shown in FIG. 1 provides for password validation as part of a device attempting to access "instance variables" (IV), e.g., VCR 100 attempting to schedule an event in DSS unit 170. Provisions of known systems, such as the CEBus control channel protocol, do not adequately support devices that have configurable security or devices that require a user to input a password when security authorization is required. The system and method described herein enhances security because passwords are not transmitted over a bus such as the CEBus. In addition, multiple devices such as VCR 100 and DSS unit 170 do not all have to know the password or words. Also, multiple passwords having different security levels associated with each password are supported. Timers within a device are not needed and, in particular, a requesting device can take as long as necessary to generate a password, thus supporting user inputted passwords. The exemplary password validation system includes an authentication feature that is implemented using the GE Encryption and Authentication Algorithm Version II as documented in EIA IS-60.4 Part 6 entitled "Application Layer Specification Appendix A".

Figure 4:
FIGS. 4–7 show, in block diagram form, various communication operations occurring between devices included in the systems shown in FIGS. 1–3.

As an example of password validation, consider a bus such as the CEBus. Three scenarios are possible for executing operations that may require password validation on the CEBus. The first scenario is a normal CEBus request, i.e., Implicit_Invoke, Explicit_Invoke, Conditional_Invoke, or Explicit_Retry. As shown in FIG. 4, a normal request is transmitted from a Node A to a Node B. Node B then determines that none of the operations in the request require a password. Thus, Node B will execute the request.

Figure 5:
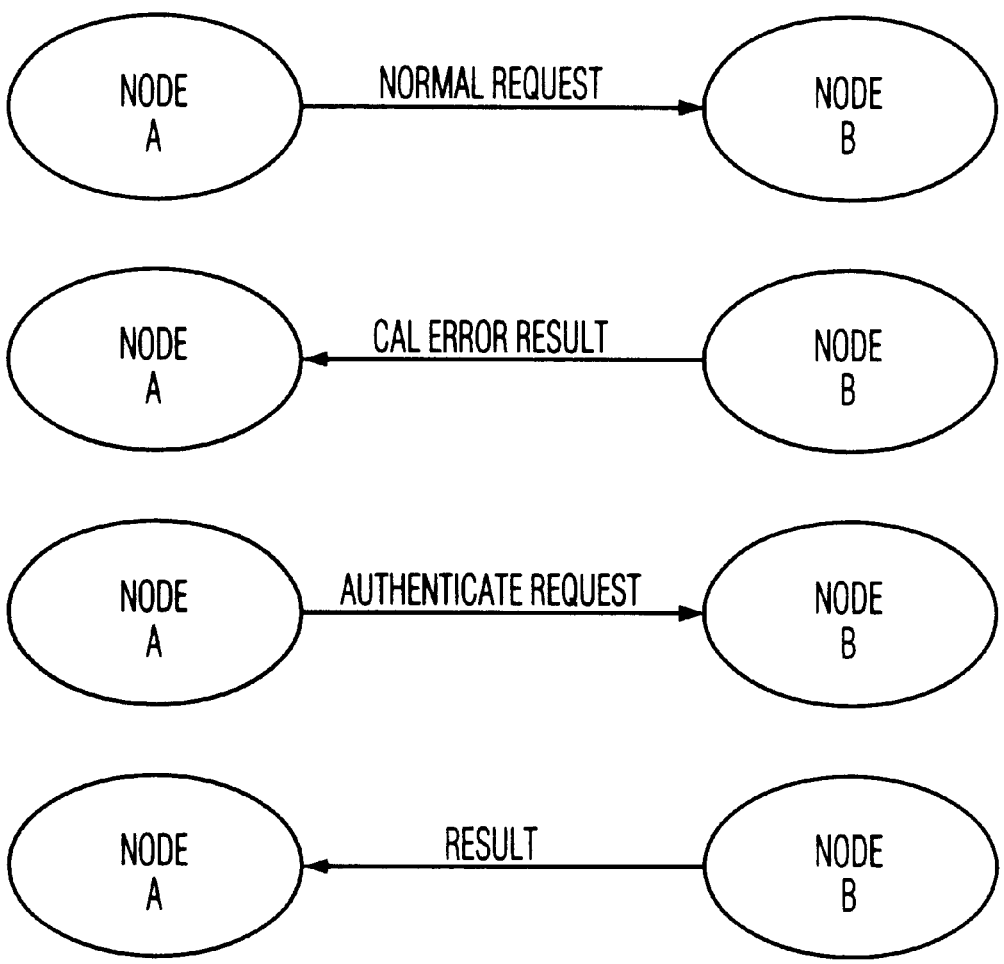

The second scenario is a normal request (Implicit_Invoke, Explicit_Invoke, Conditional_Invoke, or Explicit_Retry) that requires a password. As shown in FIG. 5, a normal request is transmitted from Node A to Node B. Node B determines that a password is required to execute part of the request. Node B returns a CAL error to Node A indicating that access to a secure instance variable (IV) was denied to Node A. Node A will then prompt the user for a password comprising, for example, from one to 18 characters (bytes). Any of the 18 bytes not entered will be set to zero. Node A then re-sends any operations that are necessary as an Authenticate Invoke packet using the above-mentioned authentication feature. In this packet, the message text is the operations required, the Authentication Key is the password, the Authentication Key ID is 0, and the Authentication Algorithm ID is 3. The packet may optionally be encrypted. Node A then transmits the Authenticate Invoke packet to Node B. Node B receives the request and checks validation using its known password(s) as the Authentication Key to the authentication algorithm. If Node B has several security levels with different passwords for each level, the validation will be checked using each password (starting with the lowest security level) until validation is successful or all known passwords are tried. The MT layer will let the Application Layer know which level of security was successful. If the Authenticate Invoke packet passes validation, Node B performs the operations and the Application Layer will check to see if the appropriate security level is now met. If validation is successful but the security level is not high enough to perform the operations, then Node B will return a CAL error that indicates access to a secured IV was denied. If the Authenticate Invoke packet fails validation for all known passwords, Node B sends a Reject Packet with a reject code of Failed_Authentication (33h).

Figure 6:
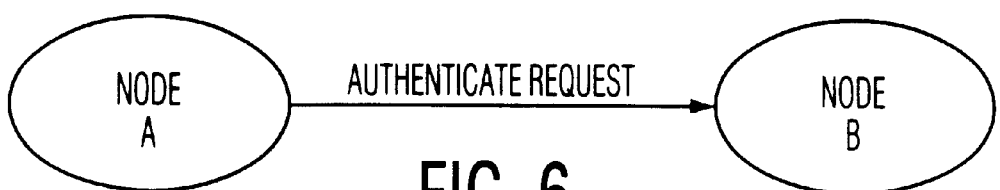

A third scenario occurs when a CEBus authenticate request (Authenticate_Imp_Invoke, Authenticate_Exp_Inv, Authenticate_Cond_Inv, or Authenticate_Exp_Retry) packet is transmitted from Node A to Node B as shown in FIG. 6. In this scenario, Node A generates an authenticate request packet using the authentication algorithm with the Authentication Key being the password, the Authentication Key D being 0, and the Authentication Algorithm ID being 3. The packet may optionally be encrypted. Node B receives the request and checks validation using its known password(s) as the Authentication Key to the authentication algorithm. If Node B has several security levels with different passwords for each level, the validation will be checked using each password (starting with the lowest security level) until validation is successful or all known passwords are tried. the MT layer will let the Application Layer know which level of security was successful. If the request passes validation, the request will be executed and the Application Layer will check if the appropriate security level is now met. If validation is successful but the security level is not high enough to perform the operation(s), then Node B will return a CAL error indicating that access to a secured IV was denied. If the request fails validation for all known passwords, a Reject packet with the reject code Failed_Authentication (33h) will be sent from Node B to Node A.

If no password exists at either node, a password of 18 zeros will be used. Node A can either request user input to generate the password or use a password stored in memory. Node B must have the password stored in memory or use the default password.

Figure 7A:
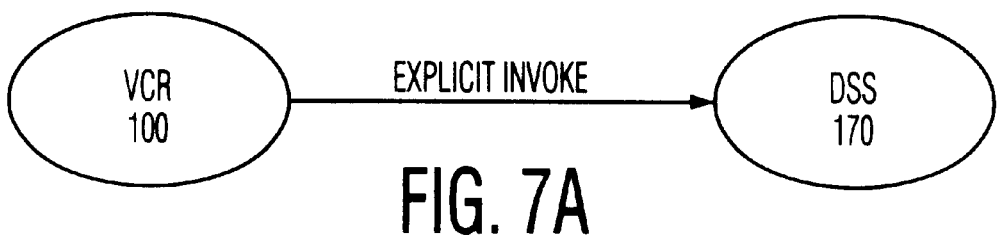
Figure 7B:
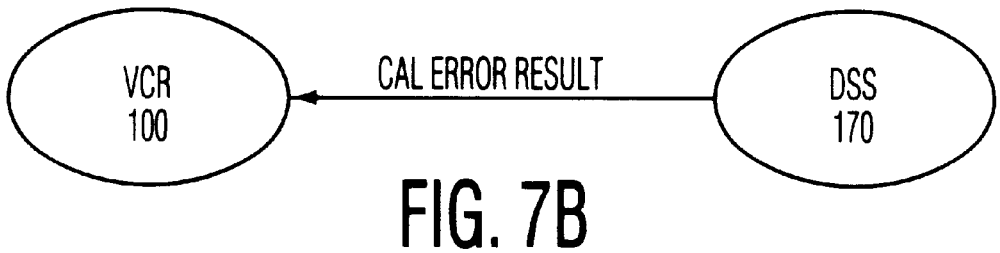
Figure 7C:
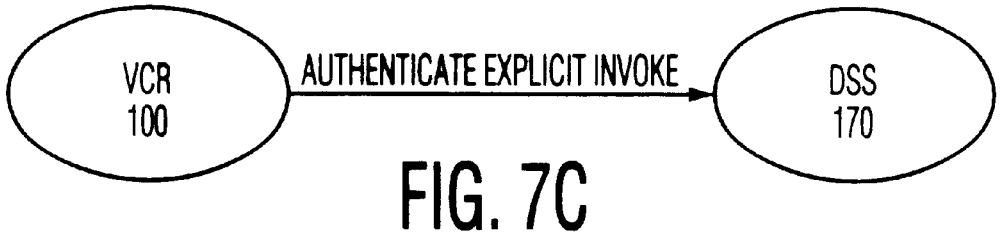
Figure 7D:
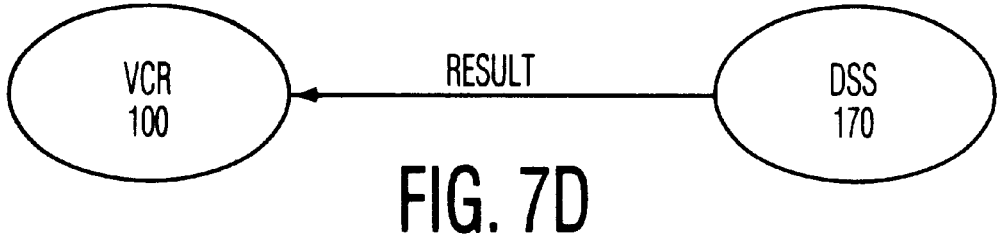
Figure 7E:
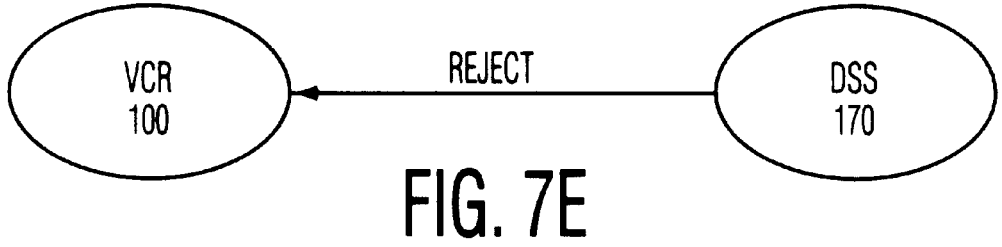
Figure 8:
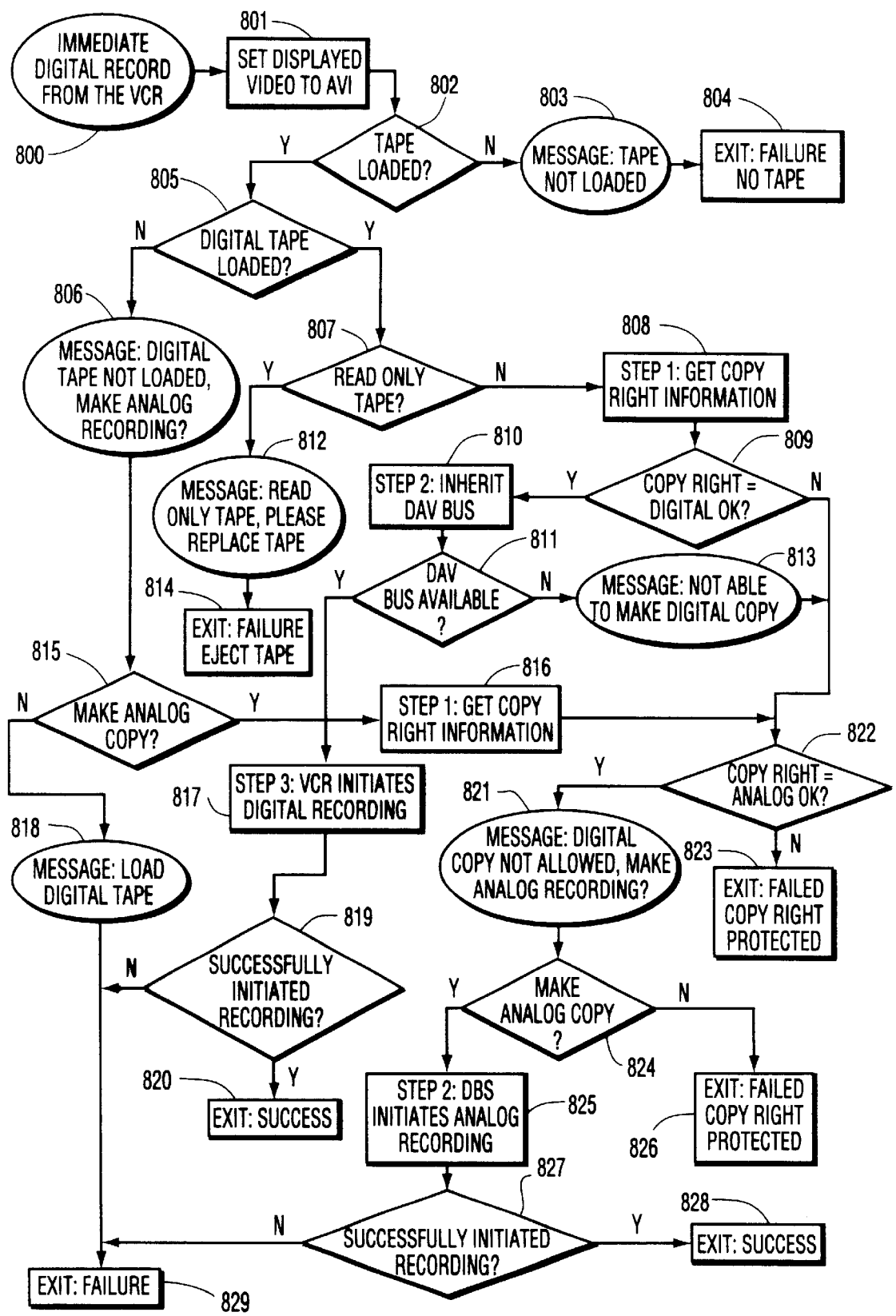
FIGS. 8–16 show, in flowchart form, the operation of systems shown in FIGS. 1–3.
Figure 9:
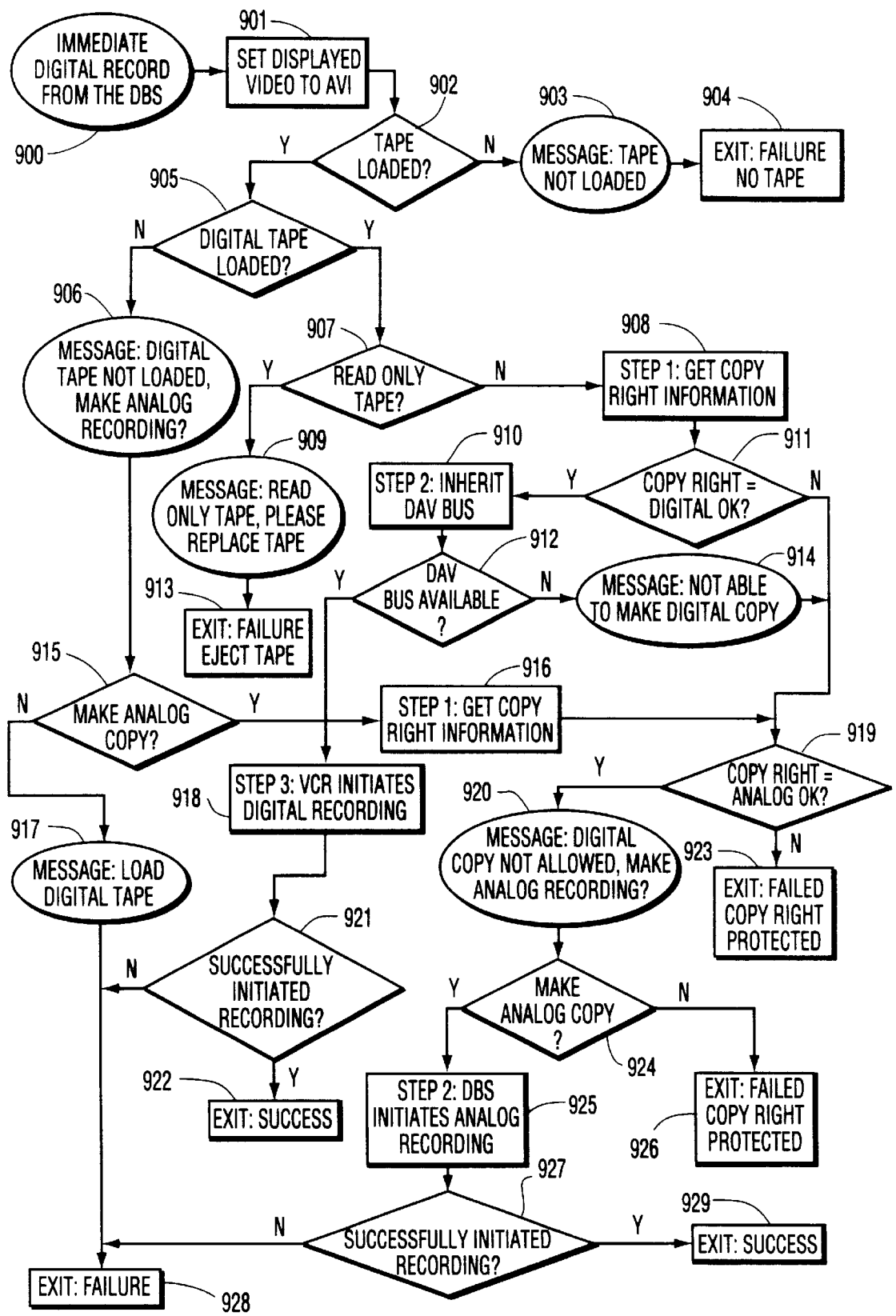
Figure 10:
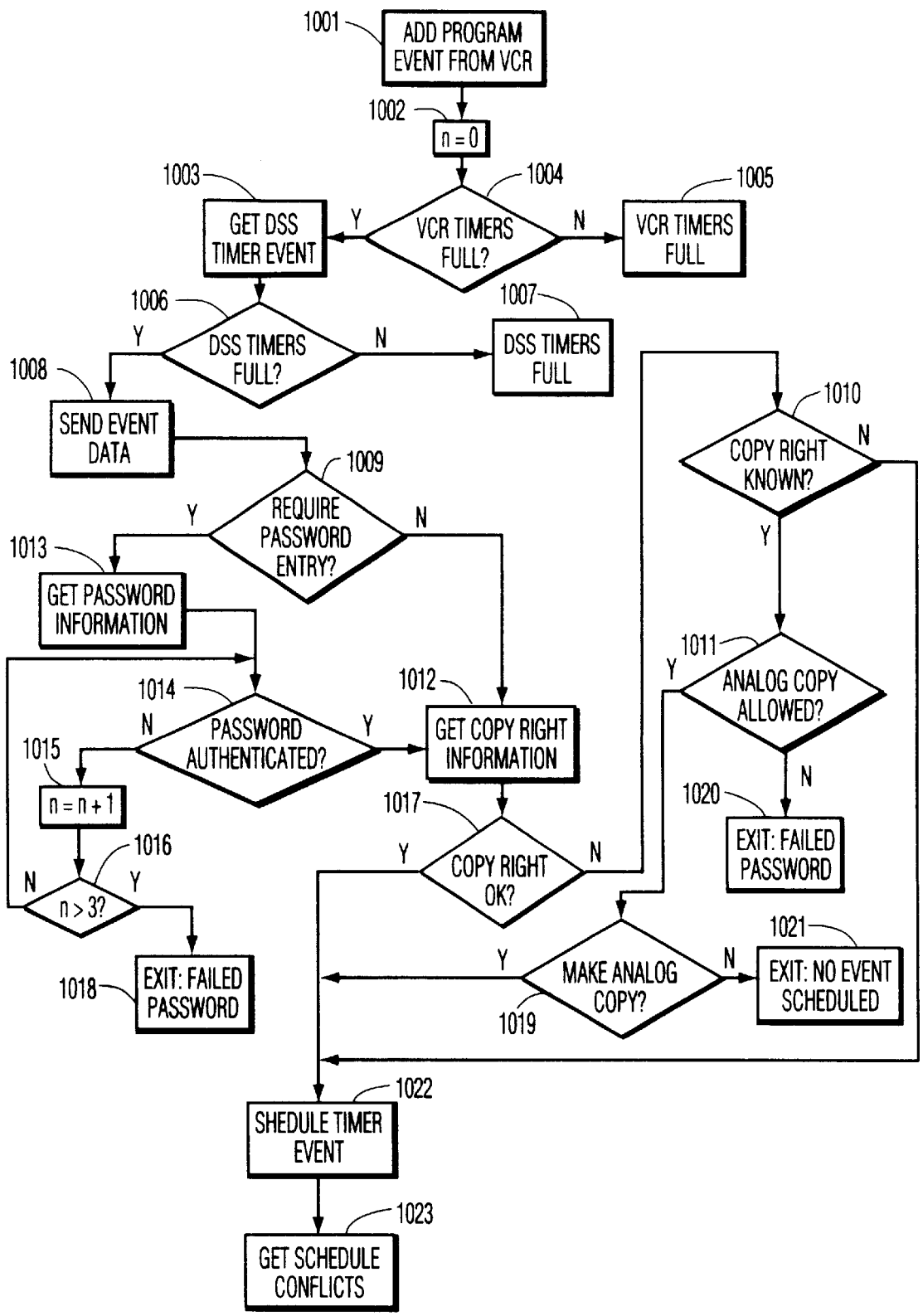
Figure 11:
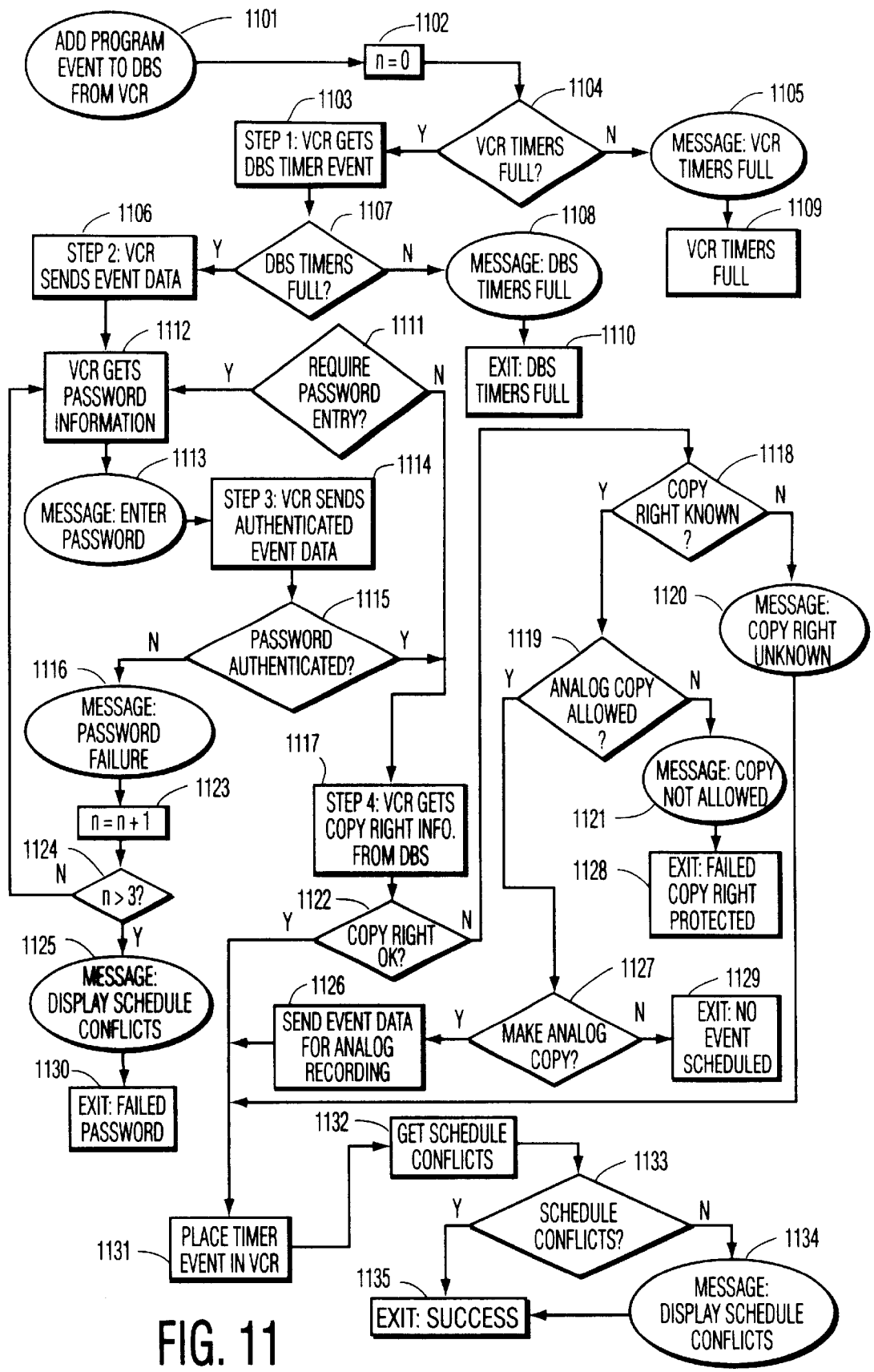
Figure 12A:
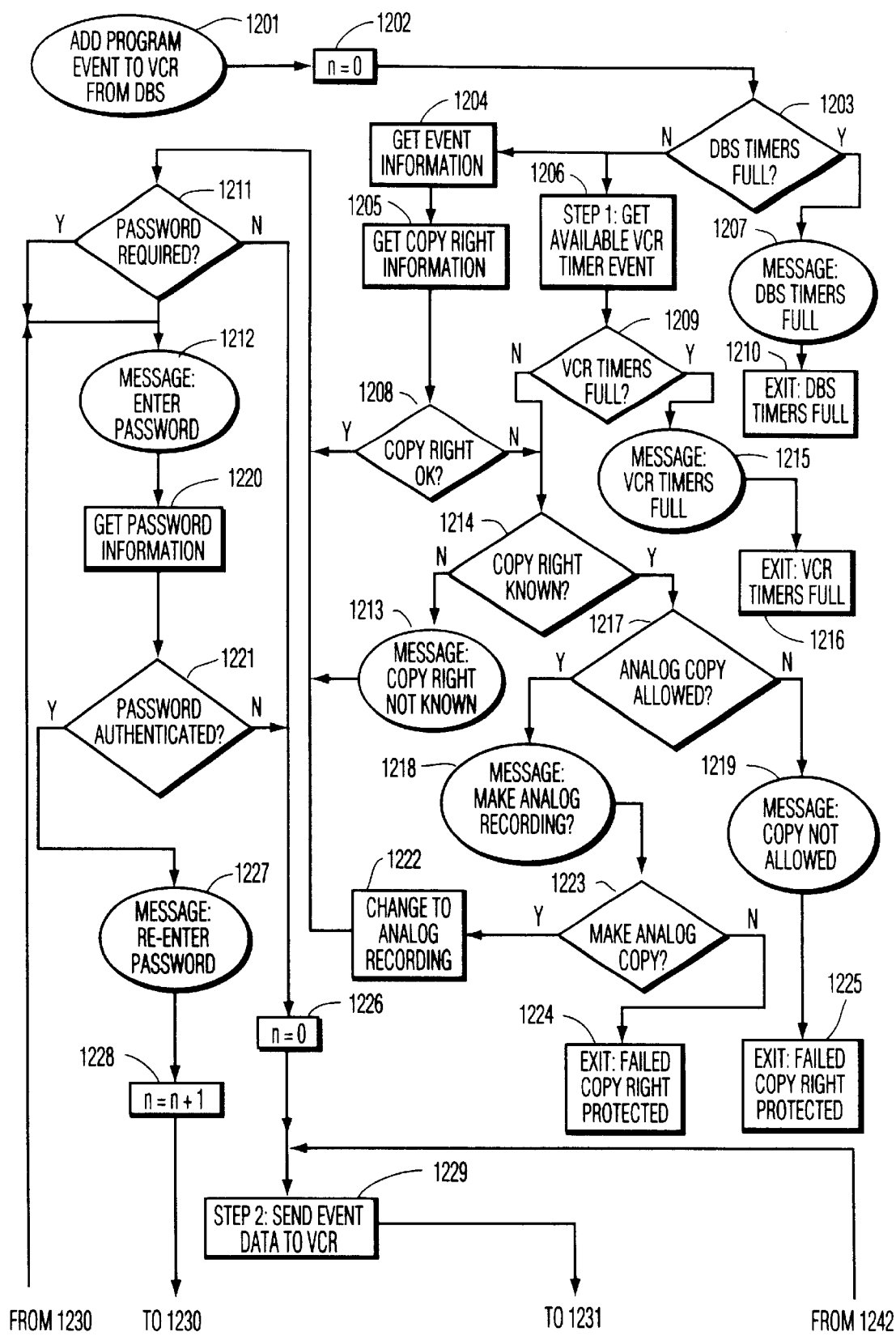
Figure 12B:
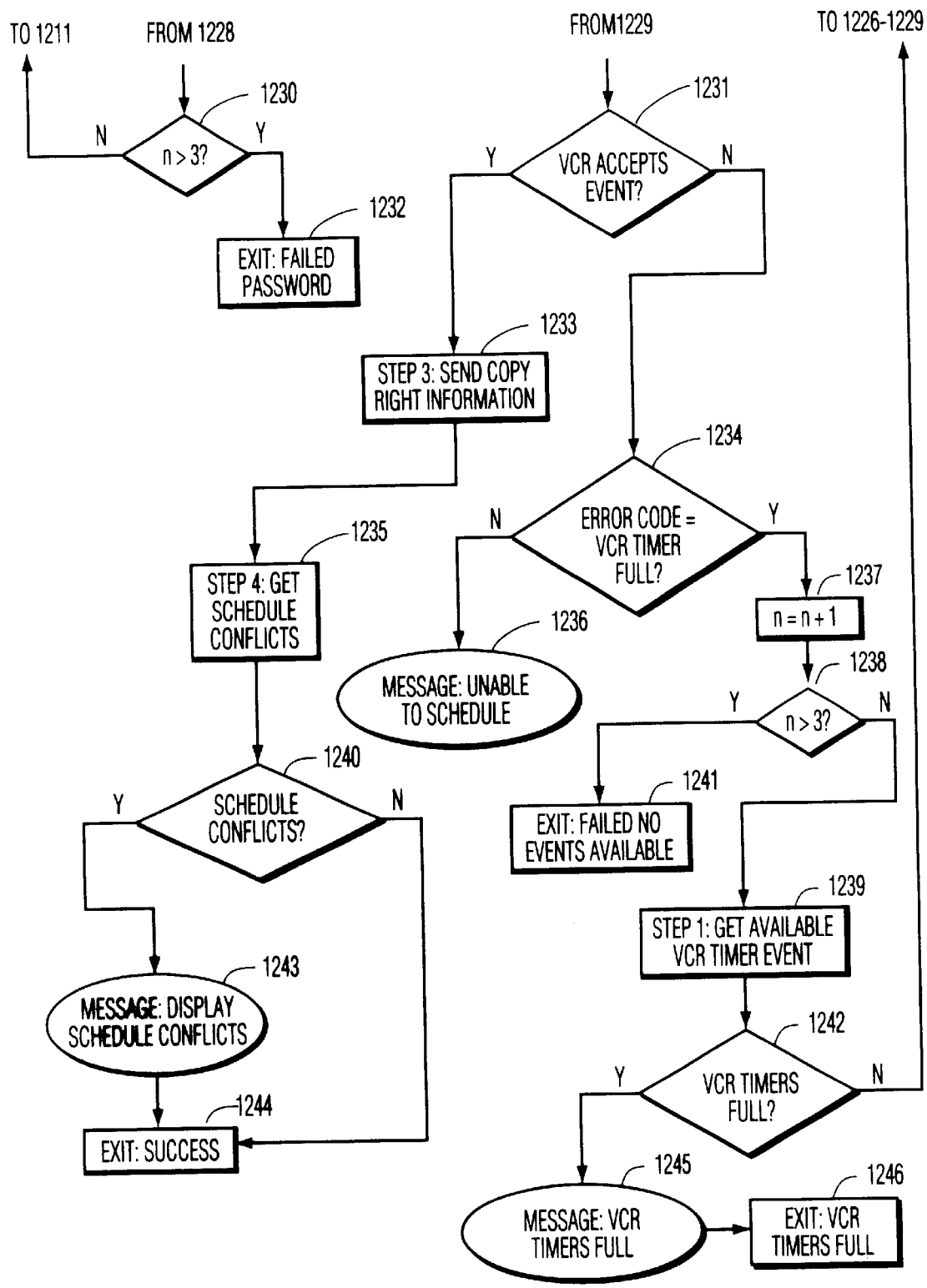
Figure 13:
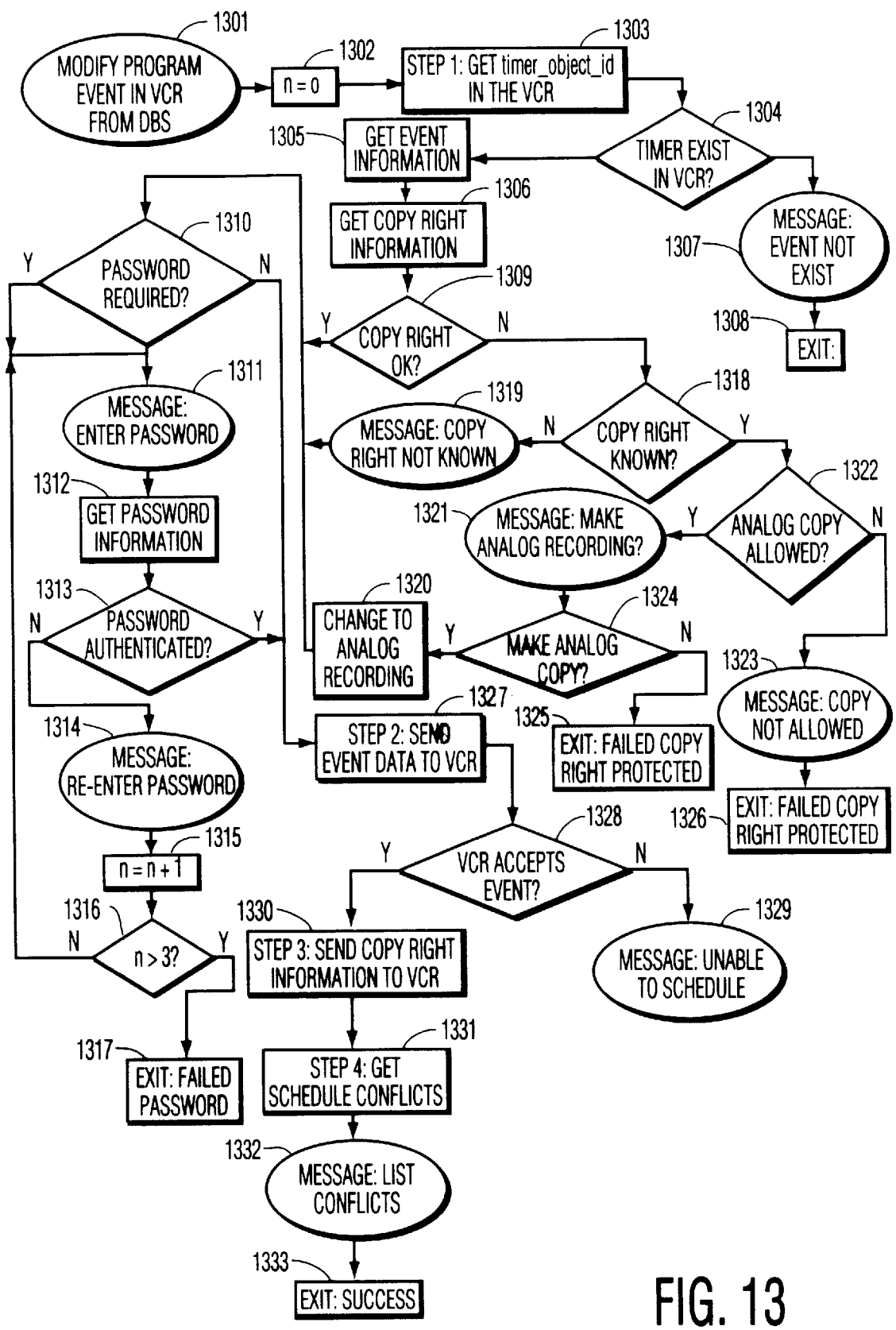
Figure 14:
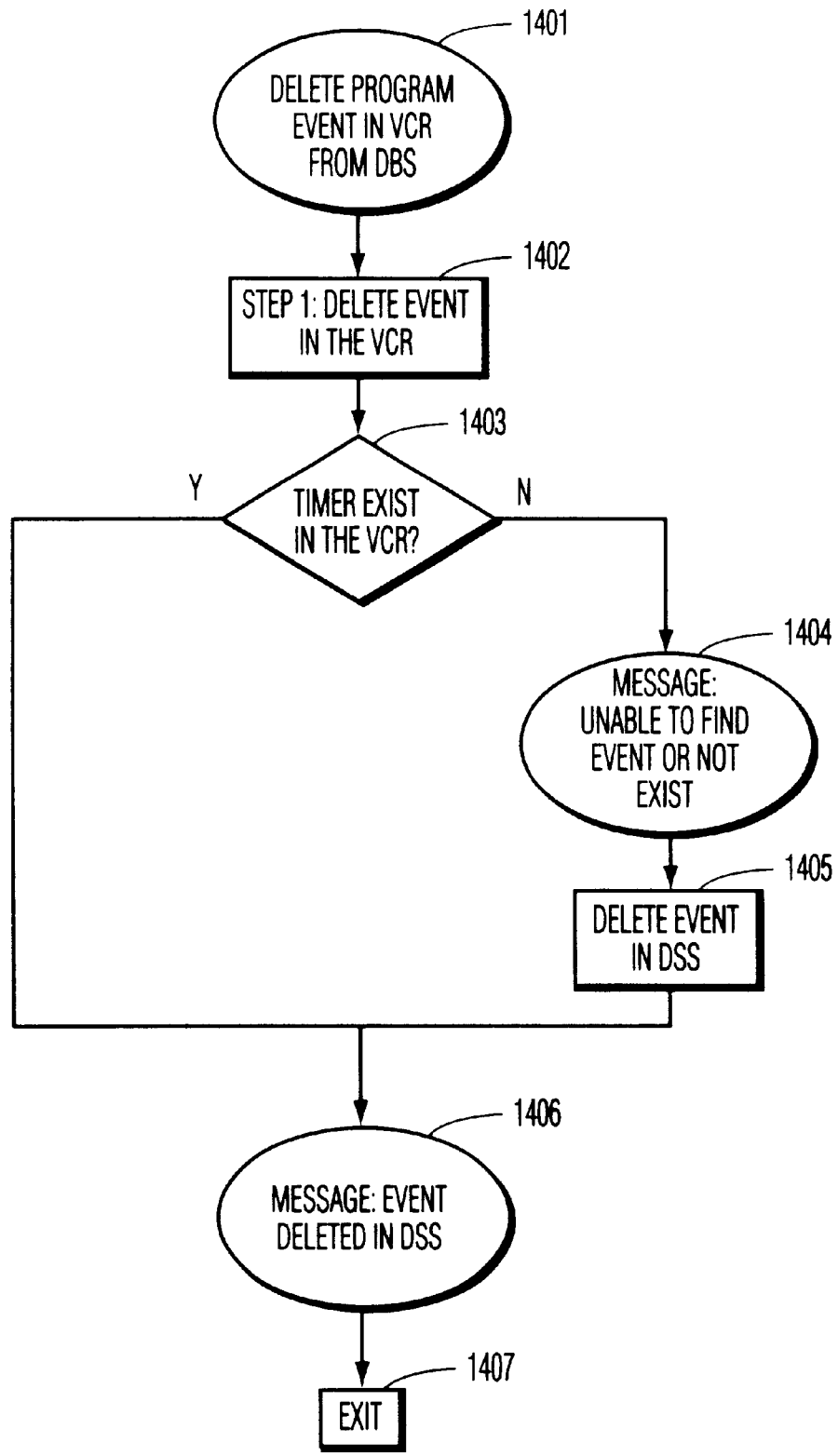
Figure 15:
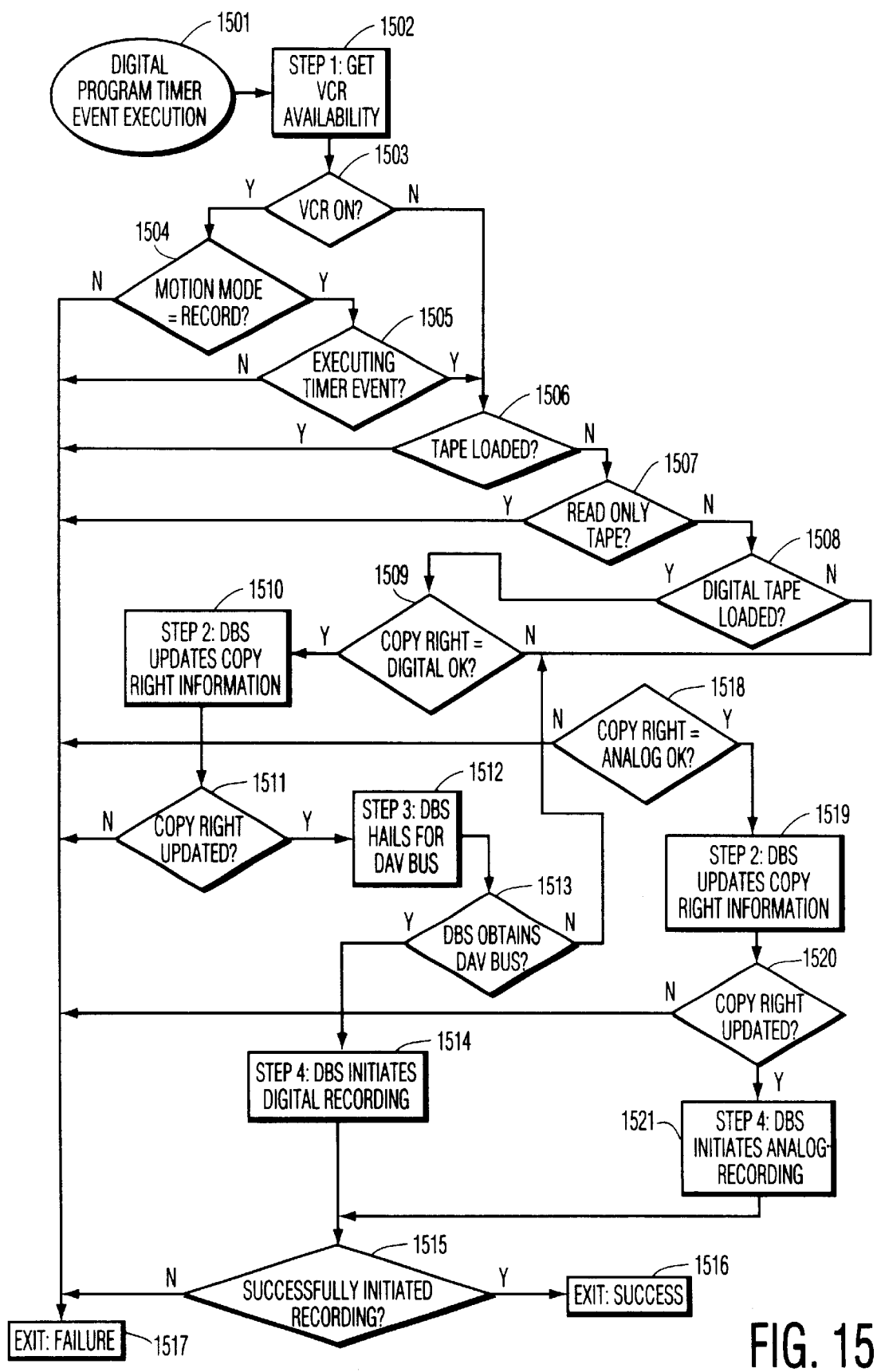
Figure 16:
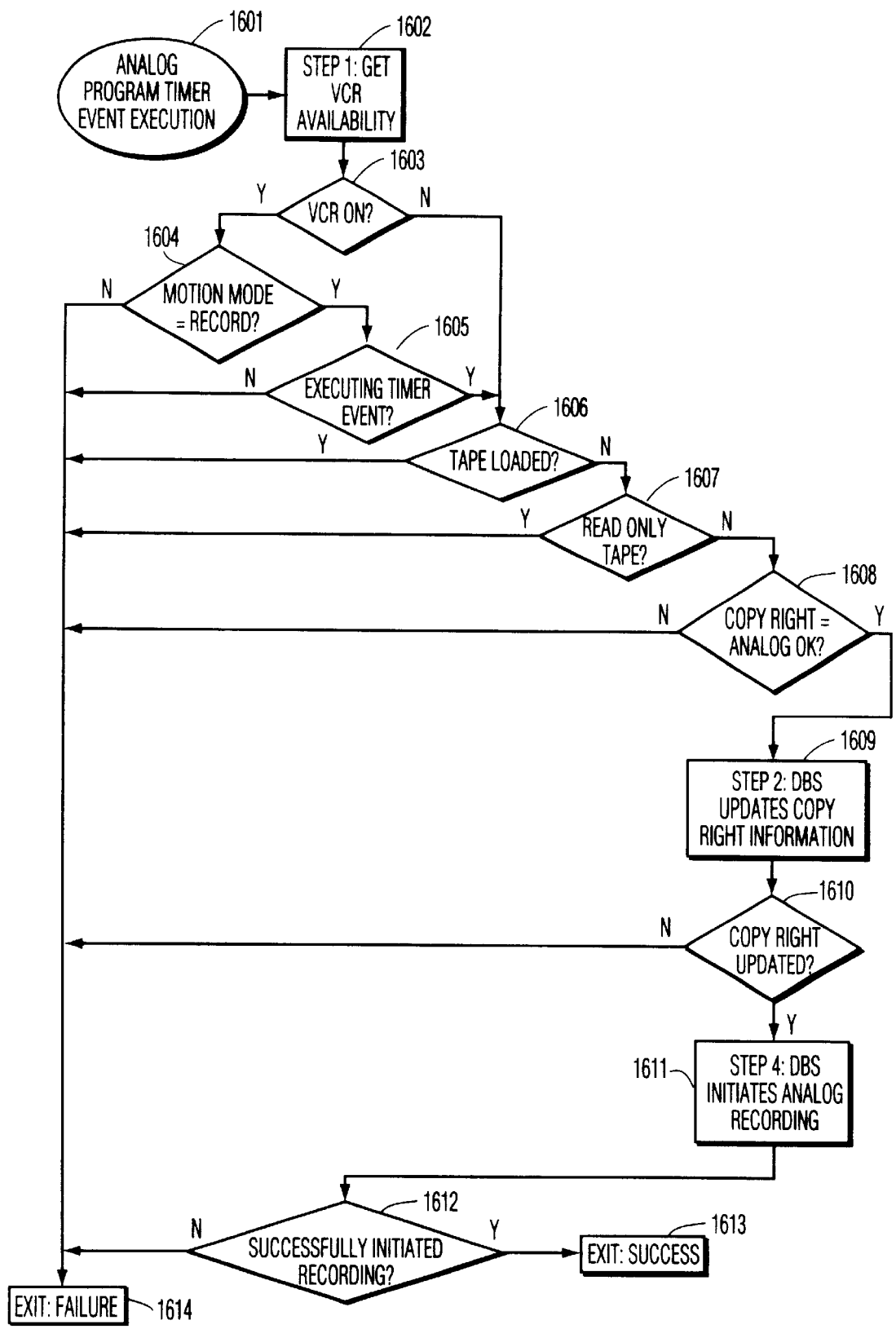

A specific example will now be explained in reference to the interface between VCR 100 and DSS unit 170 in FIGS. 1–3. A simplified version of the interface is depicted in FIGS. 7A through 7E. In FIG. 7A, a user enters a timer event into VCR 100 which requires the same event to exist on DSS unit 170. VCR 100 sends an Explicit Invoke to DSS unit 170 to create a timer event in DSS unit 170. DSS unit 170 determines that the timer event requires a password because the event exceeds a spending limit imposed on pay-per-view purchases, or exceeds a rating level, or the event is too far in the future. As shown in FIG. 7B, DSS unit 170 sends a CAL Error Result to VCR 100 indicating that access to a secured IV was denied. VCR 100 prompts the user for a password and uses the entered password to create an Authenticate Explicit Invoke packet. VCR 100 then sends the Authenticate Explicit Invoke packet to DSS unit 170 as shown in FIG. 7C. DSS unit 170 receives the Authenticate Invoke packet and validates it using the DSS unit's password(s). If the Authenticate Invoke passes validation and the security level is high enough to perform the operation, the timer event is successfully scheduled with DSS unit 170. As in FIG. 7D, DSS unit 170 sends a Result packet to VCR 100 with a COMPLETED TOKEN (FEh). If the Authenticate Invoke passes validation and the security level is not high enough to perform the operation, the timer event is not scheduled with DSS unit 170. In this case, DSS unit 170 sends a Result packet to the VCR with an ERROR TOKEN (FDh) and an erro code indicating that access to a secured IV was denied. If the Authenticate Response fails validation for all passwords of DSS unit 170, the timer event is not scheduled with DSS unit 170 and DSS unit 170 sends a Reject packet to VCR 100 with a reject code of Failed_ Authentication (33h) as shown in FIG. 7E.

A detailed description of an embodiment implementing an interface system that provides the above described features follows. In addition to explanatory text, the following description provides CAL language (common application language) instructions that, for one skilled in the art, clearly define an exemplary embodiment of the above-described system. As a further aid to understanding the following description, FIGS. 8 through 16 provide flowcharts illustrating the system and methods described below.

The DVHS-VCR being developed by Thomson Consumer Electronics, Inc. has a standard A/V input, A/V IN, as well as the simplified Digital A/V Bus, DAV. This allows the DVHS-VCR to record and play back either standard analog or digital video and audio. The DAV bus uses a P1394 physical layer to send the digital bit stream. The CEBus uses a single ended common collector physical layer and the IS-60 communication protocol.

The analog input, A/V IN, allows the user to monitor the DSS video from the VCR. This capability also allows the VCR to record the analog video and audio signal. The VCR has a default recording mode determined by an external switch located on the DVHS-VCR. The user preference setup and VCR media determine the recording mode on event by event basis.

The programmed timer event information shares information necessary to schedule an event between the DSS and DVHS-VCR. This includes, among other things, time, date, program duration, recording mode (analog or digital) and frequency of the timer program event.

The DVHS-VCR play back is recording dependent. The VHS play back occurs via a conventional VHS tape display system. Digital play back involves sending a digital bit stream to the DSS for decoding and display. There are four means to send the DSS audio and video to the TV. An S-Video TV is connected directly to the DSS S-Video output. A TV with only one A/V input uses the DVHS-VCR output video switch to route DSS video to the DVHS-VCR A/V OUT. The TV RF input can receive the DSS RF modulator output. Finally, a TV can receive and send a DAV bitstream.

The DVHS includes a CEBus application layer comprising seven CEBus contexts. All CEBus devices must contain the Universal Context. The DVHS-VCR also contains a Media Transport, Tuner, User Interface, A/V (Data Channel), Receiver Control, and Time Context. The DSS3 contains the Tuner, User Interface, A/V (Data Channel), Receiver Control, and Time Context.

Specific operational rules governing the playback and recording functions of the DSS-DVHS interface are described first.

The next section describes the DSS and VCR interaction necessary to schedule and carry out a pre-scheduled Program Timer Event from the VCR User Interface. The program timer recording event requires three separate functions: (1) Resource verification; (2) Password validation; (3) Copy Protection; (4) Error or conflict resolution; and (5) the record event.

In the case of establishing a DSS scheduled programmed event from the VCR, the VCR must retain the event and wait for the DSS to initiate the recording. The VCR can add or delete program event information in the DSS. The VCR may not remotely modify the DSS program events. The DSS updates the VCR when the DSS user interface deletes or changes a program timer event. If the event is deleted from the VCR user interface, the VCR deletes the event in the DSS. The VCR cannot modify the DSS program timer event data.

The DSS is responsible for initiating the record session. The DSS request VCR availability, Tape Type, switches the VCR's A/V input to DSS Video, and Hails for the DAV bus (digital recordings). The error and conflict resolution function involves the detection of a Tape Type miss-match, VCR schedule conflicts, or VCR not on the bus (no response).

The VCR maintains the scheduled event until it expires or is pre-empted by another programmed event timer. The steps required to setup a program timer event with the DSS from the DVHS-VCR are as follows.

STEP 1: DSS Availability Inquiry

The VCR verifies it has an available Program Timer Event Object. If there are no available events, the VCR generates an OSD message indicating the VCR program event scheduler is full.

The VCR sends an Explicit_Invoke message to all Data Memory class objects (16) in the DSS Time Context (05) requesting "If current_status=not programmed then getValue timer_object_id "m" (6D). The DSS returns a completed token "FE" plus the timer_object_id IV value "m" for those program event objects not in use ("C"=0). All other Program Timer Event Objects return FC. The VCR will use the first available program event timer.

The following CAL command is sent from the VCR to the DSS:

"05 00 16 56 43 E8 30 F7 43 6D F8"

The command reads as:=<for time context (05), any (00) event timer class object (16)><if (56)<current status "C" (43) equals (56) zero (30)><Begin (F7)><getValue (43) timer_object_id "m" (6D)><END (F8)>

Example: For Timer Context (05h) Program Even Timer objects (03h)–(0Ah), assume object (04h) and (07h) are not in use. The response from the DSS is:

FC FE 34 FC FC FE 37 FC FC FC

In this case the Command is sent with the protocol services:

MT Service Level

APDU Mode: Basic Fixed

APDU Type: Explicit_Invoke

NL Service Level

NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High If there are no time slots available the DSS returns "FC FC FC FC FC FC FC FC"
The VCR displays appropriate OSD to indicate either the VCR, DSS or both do not have additional program event timers available.

STEP 2: Setting Program Timer Event

The VCR sends event_data, instant variable "e", to the Program timer Event object with the received timer_object_id, IV value, LL The symbol LL is the received program timer object timer_object_id value. It is a hex variable.

The VCR sends an Explicit_Invoke message to the Program Timer Event object (LL) in the DSS Time Context (05):
05 LL 46 65 F5 F5 F4 31 32 F6 DnnnLnTnRIAM"
where "DnnnLnTnRIAM" are the data bytes. The LL field is the hex value of the available DSS program timer event object timer_object_id IV returned by the DSS in STEP 1.

The command reads as:=<for time context (05), Program Timer Event object (LL)><setArray (46)<event_data IV (65) <delimiter (F5)(offset=0)><delimiter (F5)><DATA Token (F4)><number of bytes=12 (31 32)><Escape Token (F6)>DnnnLnTnRIAM>

The receiving node, DSS, returns the completed token, "FE". The complete token indicates the setArray Method was executed on the event_data IV.
The Command is sent with the protocol services:
MT Service Level
APDU Mode: Basic Fixed
APDU Type: Explilcit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High
Error Condition: Event_Data not accepted , setArray method not completed.

The DSS returns the Error Token FD and appropriate error return code. The VCR attempts to locate a new available object. If the VCR finds a new object it places the event in the new object. Otherwise, the VCR generates a no timers in DBS available error message.
Error Condition: Pre-condition not satisfied The DSS returns FD 31 38. This indicates that the event_data was not updated because a pre-condition was not satisfied (the object was already programmed.) The VCR must locate a new available program timer event object. If there are no available program timer event objects, the VCR generates and OSD message.

Error Condition: Password required

The DSS returns FE FD. The return code indicates that the variable is protected and requires a password. The VCR prompts the User to enter a DSS Password. The four character password is used to encrypt the timer_event IV value. The timer_event IV data is sent to the DSS as encrypted data.

STEP 3: Password Authentication

The DSS checks the received event_data value and determines if the program selection requries a password. If password authentication is required, the DSS returns an authentication error/reject indication to the VCR. The VCR generates an OSD to request a DSS password. The DSS password is used to construct an authenticated message. The VCR sends an authenticated data packet to the DSS. The DSS verifies that the requested program and password level are in agreement. If they are in agreement the DSS returns a completed token "FE". Otherwise the DSS resends the authentication error/reject indication.

STEP 4: Copy Right Authorization

Once an appointment is accepted, the DSS extracts the copy right level information from the user guide and places it in its program timer event object copy_protection p (70) instant variable. Initially the VCR's copy_protection IV is set to UNKNOWN. The VCR must obtain the copy right information from the DSS before it begins recording. The VCR sends an Explicit_Invoke message to the DSS Time Context (05), Program Timer Event Object (LL) requesting "getValue of copy_protection IV, "p" (70). The DSS returns a completed token "FE" plus the copy_protection IV value. The following CAL command is sent from the VCR to the DSS:
"05 LL 43 70"

The command reads as:=<for time context (05), any program timer event object (LL)><getValue (43) copy_protection IV "p" (70)>

The receiving node, DSS, returns the completed token, "FE" plus the present value of "p". The complete token indicates the getValue Method was executed on the event_data IV. The VCR must verify that it can record the program and that the recording means, digital or analog, is in compliance with the copy_protect IV value. The copy_protect IV values are as follows:
30h=copy allowed
31h=analog copy allowed
32h=1 analog copy allowed
33h=1 digital copy allowed
34h=no copies allowed
35h=unknown
The Command is sent with the protocol services:
MT Service Level
APDU Mode: Basic Fixed
APDU Type: Explilcit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High
Error Condition: Copy_Protection IV set to UNKNOWN.

This condition indicates that the copyright limitations are unknown due to a flaw in the DSS program guide or the program is scheduled beyond the limits of the program guide. The DSS will update the VCR's program timer copy_protection IV when it is changed to a known state. The VCR may not keep the appointment when the copy_ protection IV is set to UNKNOWN at the time of the appointment. The VCR must warn the user that the copy right level is UNKNOWN and that the recording may not take place.

Error Condition: Copy_Protection IV not consistant with requested recording mode.

This occurs when the requested recording mode does not comply withe the copy_protection IV level. The VCR generates an OSD to indicate the requested record level is not allowed and indicates alternative method. When digital recordings are not pemitted but analog recordings are permitted, the VCR prompts the user to the analog option. If the user does not choose the analog option the program timer event object is reset and the appointment is erased in the DSS by the VCR.

STEP 5: Program Event Schedule Conflicts

The VCR checks for schedule conflicts between events in both the remote device and VCR. It also verifies that the conflicts are unique. The VCR sends an Explicit_Invoke message to the DSS Time Context (05), Program Timer Event Object (LL), "getValue of event_conflict IV, "t" (74). The following CAL command is sent from the VCR to the remote device, (DSS): "05 LL 43 74". The command reads as:=<for time context (05), any program timer event object (LL)><getValue (43) event_conflict IV "t" (74)>The DSS returns a completed token "FE" plus the event_conflict IV value.

EXAMPLE

For Timer Context (05h) Program Even Timer objects (03h)–(0Ah), assume object (02h) and (0Ah) in the remote device, DSS, are in conflict with object (04). The VCR sends the CAL Command: "00 04 43 74". The DSS returns the completed token, "FE", and the numeric values for objects 02 and 0A: "FE 30 32 31 30". The Command is sent with the protocol services:
MT Service Level
APDU Mode: Basic Fixed
APDU Type: Explilcit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High There is one required step to delete a program timer event in the DSS from the DVHS-VCR. The VCR sends an Explicit_Invoke message, dependent upon the event_data instant variable value, to all DSS Time Context (05) Memory Data class objects (16). If the event_data instant variable matches the incoming event then clear_event is set to 00h. The receiving object, DSS, then resets the clear_ event=01h. The following CAL command is sent from the VCR to the DSS:
"05 00 16 56 65 E8 F4 31 32 F6 DnnnLnTnRIAM F7 41 63 F8"
where "DnnnLnTnRIAM" are the data bytes.

The command reads as:=<for time context (05), any (00) Data Memory class object (16)><if (56)<current status "e" (65) equals (E8)<DATA Token (F4)><number of bytes (31 32)><Escape Token (F6)><DnnnLnTnRIAM><Begin (F7) ><setOff (41) "c" (63)><END (F8)>

The receiving node will return a completed token (FE) for the objects containing the appropriate event_data IV valuet and all the program timer event object instant variables are cleared. The DSS program timer event object Instant Variables are set to their default values. If the receiving node returns a false evaluation token (FC) the VCR assumes that the event was already deleted or is not found The VCR generates an OSD message indicating that the event was not found in the box that responded to the message.

Example

For Timer Context (05h) Program Even Timer objects (03h)–(0Ah), assume object (04h) is the object holding the appointment. The response from the DSS is:
FC FE FC FC FC FC FC FC
The Command is sent with the protocol services:
MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High Known error states developed from an attempt to set up a program timer event from the VCR will now be described.

Error State: VCR Program Event Object Unavailable

If all the VCR program events are in use the VCR does not add the new event and does not attempt to add the event to remotely located device.

Action: The VCR generates an OSD indicating the VCR program scheduler is full. The program timer event is not added to either the DSS or VCR program timer event list.

User Action: The user must delete a VCR event before proceeding.

Error State: DSS Program Event Object Unavailable

If all the DSS program events are in use, the DSS returns false evaluation for all eight program timer event objects.

Action: The VCR generates an OSD indicating the DSS program scheduler is full. The added event is deleted from the VCR event list.

User Action: The user may delete a DSS event scheduled on the VCR or change to the DSS User Interface and delete a program.

Error State: Password not verified

When the VCR attempts to schedule a program and the program requires a master password, the DSS returns an unauthenticated message error.

Action: VCR generates an OSD indicating that the program selection requires the DSS Master password. The VCR uses the provided password to generate the encryption keys. The VCR then sends the data and encryption keys to the the appropriate program timer event object in the DSS.

Error State: Program Event Schedule Conflicts

When the VCR schedules a program in the DSS and there is a conflict in either the VCR or DSS, the program event is placed in both the VCR and DSS. The DSS returns event object number(s) to indicate that there is a schedule conflict. The VCR generates an OSD indicating what programs are in conflict.

Action: DSS reports that there is a schedule conflict and the event numbers with the conflict. The VCR must display the conflicting events and indicate the location of the events.

User Action: The VCR User Interface allows the user to either ignore the event conflict or delete the newly scheduled DSS event.

The DSS and VCR interaction necessary to schedule and carry out a pre-scheduled Program Timer Event from a remote (DSS) User Interface is described next. A VCR Program Timer Event may be initiated, deleted or modified remotely. The program timer recording event requires three separate functions: (1) Resource verification; (2) Copy Protection Validation; (3) Error or conflict resolution; and (4) the record event.

The DSS request information to determine VCR availability to make a recording. The Copy Protection Validation requires the remote device and VCR to determine when a program can be legally copied. The error and conflict resolution functions involves the detection of a schedule conflict, inappropriate VCR setup and no response. The record macro function involves setup of the VCR input, to either analog or DAV inputs, instructing the VCR to begin recording, verifying the VCR is in the record mode, and tuning the DSS to the appropriate channel, (making a purchase if necessary).

The DSS will request resource verification from the VCR to determine VCR availability and Tape Type. The DSS will also switch the A/V switch to DSS Video. The error and conflict resolution function involves the detection of a Tape Type miss-match, VCR in use, or VCR not on the bus (no response). The record event function involves setup of the VCR input, to either analog or DAV inputs, instructing the VCR to begin recording, and verifying the VCR is in the record mode.

The steps required to setup, i.e., add, a program event with the DVHS-VCR from the DSS are described below.

STEP 1: The DSS verifies it has an available Program Event Object. If there are no available program event objects, the DSS generates an OSD message indicating the DSS program event scheduler is full.

Once an appointment is accepted, the DSS extracts the copy right level information from the user guide and places it in its program timer event object copy_protection p (70) instant variable. Initially the copy_protection IV is set to UNKNOWN. The DSS then determines if it legal to copy the program material and generates appropriate OSD screens in the event the program may not be copied. Once the DSS record methods and program material are in agreement it proceeds to make an appointment with the VCR.

The remote device DSS, sends an Explicit_Invoke message to all Data Memory class objects (16) in the VCR Time Context (05) requesting "If current_status=not programmed then getValue timer_object_id "m" (6D). The DSS returns a completed token "FE" plus the timer_object_id IV value "m" for those program event objects not in use ("C"=0). All other Program Timer Event Objects return FC. The remote device, DSS, uses the first available program event timer object.

The following CAL command is sent from a requesting node, the DSS, to the VCR: "05 00 16 56 43 E8 30 F7 43 6D F8"

The command reads as:=<for time context (05), any (00) Memory Data class object (16)><if (56)<current status "C" (43) equals (56) zero (30)><Begin (F7)><getValue (43) timer_object_id "m" (6D)><END (F8)>

The VCR node will return a completed token (FE) and the timer_object_id IV value for all those Data Memory class objects with a current status=0 and a false evaluation token (FC) for all Data Memory class objects with current status<>0.

Example

For Timer Context (05h) Program Even Timer objects (03h)–(0Ah), assume object (04h) and (07h) are not in use. The response from the VCR is:
FC FE 34 FC FC FE 37 FC FC FC
If there are no time slots available the DSS returns
"FC FC FC FC FC FC FC FC"
The Command is sent with the protocol services:
MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High If there are no time slots available the DSS will display appropriate OSD to indicate either the VCR, DSS or both do not have additional program event timers available.

STEP 2: Setting Program Timer Event

The remote device, DSS, sends event_data, instant variable "e", to the Program timer Event object with the received timer_object_id, IV value, LL The symbol LL is the received program timer object timer_object_id value. It is a hex variable. The remote device, DSS, sends an Explicit_Invoke message to the Program Timer Event object (LL) in the VCR Time Context (05):
05 LL 46 65 F5 F5 F4 31 32 F6 DnnnLnTnRIAM"
where "DnnnLnTnRIAM" are the data bytes. The LL field is the hex value of the available VCR program timer event object timer_object_id IV returned by the VCR in STEP 1.

The command reads as:=<for time context (05), Program Timer Event object (LL)><setArray (46)<event_data IV (65)<delimiter (F5)(offset=0)><delimiter (F5)><DATA Token (F4)><number of bytes=12 (31 32)><Escape Token (F6)>DnnnLnTnRIAM>

The VCR returns the completed token, "FE". The complete token indicates the setArray Method was executed on the event_data IV.
The Command is sent with the protocol services:
MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used
DLL Service Level Service_class: Basic
DLL service: Acknowledged
Addressed service: As required
Include source: Yes
Priority: High
Error Condition: Event_Data setArray not completed.

The VCR returns the Error Token FD and appropriate error return code. The VCR attempts to locate a new available object.
Error Condition: Pre-condition not satisfied.

The VCR returns FD 31 38. This indicates that the event_data was not updated because a precondition was not satisfied (the object was already programmed.) The remote device, DSS, must locate a new available program timer event object. If there are no available program timer event objects, the remote device, DSS, generates and OSD message.

STEP 3: Copyright Authorization

Once an appointment is accepted, the remote device, DSS, sends the copy right level information to the program timer event object copy_protection p (70) instant variable. Initially, the VCR's copy_protection IV is set to UNKNOWN. The VCR must obtain the copy right information from the remote device, DSS, before it begins recording.

The remote device, DSS, sends an Explicit_Invoke message to the DSS Time Context (05), ProgramTimer Event Object (LL) "setValue of copy_protection IV, "p" (70). The VCR returns a completed token "FE" plus the copy_protection IV value.

The following CAL command is sent from the VCR to the DSS:
"05 LL 45 70 F5<numeric>"

The command reads as:=<for time context (05), any program timer event object (LL)><setValue (45)><copy_protection IV "p" (70)><delimiter (F5)><numeric>.

The VCR, returns the completed token, "FE". The complete token indicates the setValue Method was executed on the event_data IV. The VCR must verify that it can record the program and that the recording means, digital or analog, is in compliance with the copy_protect IV value. The copy_protect IV values are as follows:
30h=copy allowed
31h=analog copy allowed
32h=1 analog copy allowed
33h=1 digital copy allowed
34h=no copies allowed
35h=unknown
The Command is sent with the protocol services:
MT Service Level
APDU Mode: Basic Fixed
APDU Type: Explilcit_Invoke
NL Service Level
NPDU Type: non-extended service
Routing: Directory
Allowed Media: Not Used
BR1: Not Used
BR2: Not Used
DLL Service Level
Service class: Basic
DLL service: Acknowledged
Addressed service: As required
Include source: Yes
Priority: High
Error Condition: Copy_Protection IV set to UNKNOWN.

This condition indicates that the copy right limitations are unknown due to a flaw in the, remote device, DSS, program guide or the program is scheduled beyond the limits of the program guide. The remote device, DSS, will update the VCR's program timer copy_protection IV when it is changed to a known state. The VCR may not keep the appointment when the copy_protection IV is set to UNKNOWN at the time of the appointment. The VCR must warn the user that the copy right level is UNKNOWN and that the recording may not take place.
Error Condition: Copy_Protection IV not consistant with requested recording mode.

This occurs when the requested recording mode does not comply withe the copy_protection IV level. The remote device, DSS, generates an OSD to indicate the requested record level is not allowed and indicates alternative method. When digital recordings are not pemitted but analog recordings are permitted, the remote device, DSS, prompts the user to the analog option. If the user does not choose the analog option the program timer event object is reset and the appointment is erased in the VCR by the remote device, DSS.

STEP 4: Program Event Schedule Conflicts

The remote device, DSS, checks for schedule conflicts between events in both the remote device and VCR. It also verifies that the conflicts are unique. The remote device, DSS, sends an Explicit_Invoke message to the VCR Time Context (05), Program Timer Event Object (LL), "getvalue of event_copy IV, "t" (74).

The following CAL command is sent from the remote device, DSS, to the VCR:
"05 LL 43 74"

The command reads as:=<for time context (05), any program timer event object (LL)><getValue (43) event_conflict IV "t" (74)>

The VCR returns a completed token "FE" plus the event_conflict IV value.

Example

For Timer Context (05h) Program Even Timer objects (03h)–(0Ah), assume object (02h) and (0Ah) in the remote device, DSS, are in conflict with object (04). The remote device, DSS, sends the CAL Command: "00 04 43 74"

The VCR returns the completed token, "FE", and the numeric values for objects 02 and 0A: "FE 30 32 31 30"
The Command is sent with the protocol services:
MT Service Level
APDU Mode: Basic Fixed
APDU Type: Explilcit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High The following single step is used to delete a program timer event in the VCR from the DSS.
STEP 1: Conditional Deletion The DSS sends an Explicit_Invoke message, dependent upon the event_data instant variable value, to all VCR Time Context (05)) Memory Data class objects (16). If the event_data instant variable matches the incoming event then clear_event is set to 00h and all event related data is cleared from the object.

After the object's event related data is cleared, the receiving object, VCR, resets the clear_event=01h (Boolean True).

The following CAL command is sent from the remote device, DSS, to the VCR:

"05 00 16 56 65 E8 F4 31 32 F6 DnnnLnTnRIAM F7 41 63 F8" where "DnnnLnTnRIAM" are the data bytes.

The command reads as:=<for time context (05), any (00) Memory Data class object (16)><if (56)<current status "e" (65) equals (56)<DATA Token (F4)><number of bytes (31 32)>Escape Token (F6)><DnnnLnTnRIAM><Begin (F7)><setOff (41) "c" (63)><END (F8)>

The VCR node will return a completed token (FE) if the condition is met and the data is placed into the event_data instant variable. Otherwise the receiving node returns a false evaluation token (FC). The VCR returns a completed token (FE) for the object containing the event_data IV value and all the program timer event object instant variables are cleared. The DSS program timer event object Instant Variables are set to their default values. If the VCR returns a false evaluation token (FC) the remote device, DSS, assumes that the event was already deleted or is not found The DSS generates an OSD message indicating that the event was not found in the box that responded to the message.

Example

For Timer Context (05h) Program Even Timer objects (03h)–(0Ah), assume object (04h) is the object holding the appointment. The response from the VCR is:
FC FE FC FC FC FC FC FC
The Command is sent with the protocol services:
MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2; Not Used
DLL Service Level
Service_class: Basic
DLL service: Acknowledged
Addressed service: As required
Include source: Yes
Priority: High The following three steps are required to modify a program timer event in the VCR from the DSS.
STEP 1

The remote device, DSS, sends an Explicit_Invoke message, dependent upon the event_data instant variable value, to all VCR Time Context (05) Data Memory class objects (16). If the event_data instant variable matches the incoming event the VCR returns the Completed result "FE" and its timer_object_id IV, "m", value. All other objects return the False Evaluation result "FC".

The following CAL command is sent from the DSS to the VCR:

"05 00 16 56 65 E8 F4 31 32 F6 DnnnLnTnRIAM F7 52 F8" where "DnnnLnTnRIAM" is the event_data instant variable data.

The command reads as:=<for time context (05), any (00) Data Memory class object (16)><if (56)<current status "e" (65) equals (56)<DATA Token (F4)><number of bytes (31 32)><Escape Token (F6)><DnnnLnTnRIAM><Begin (F7)><<)><getValue (43) timer_object_id "m" (6D)><END (F8)>

The program timer object containing the supplied event_data IV value returns a completed token indicating the condition is met, "FE", and a second completion token, "FE", and the timer_object_id IV value. Those program_timer_objects not evaluation as TRUE return the false evaluation token, "FC".

Example

If the VCR Time Context (05) Program Timer Event objects are (03h)–(0Ah) and the object corresponding event to be modified is in object (08h) the VCR returns
"FC FC FC FC FC FE FE 38 FC FC"
The Command is sent with the protocol services:
MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High
STEP 2: Modifing event_data IV Information The DSS sends Explicit_Invoke message to modify the event_data instant variable. The following CAL command is sent from the DSS to the VCR:
"05 (LL) 46 F5 F5 F4 31 32 F6 DnnnLnTnRIAM"
where "DnnnLnTnRIAM" is the event_data information.

The command reads as:=<for time context (05), program event timer object (LL)><setArray (46)<delimiter>(offset=0)<delimiter><DATA Token (F4)><number of bytes=12 (31 32)><Escape Token (F6)>DnnnLnTnRIAM>

The VCR returns a completed token (FE) when the data is placed into the event_data instant variable. Otherwise, the receiving node returns an Error Token, "FD", with the appropriate error/return message.
The Command is sent with the protocol services:
MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High
STEP 3: Copy Right Authorization Once an appointment is accepted, the remote device, DSS, sends the copy right level information to the program timer event object copy_protection p (70) instant variable. The VCR's copy_protection IV must be updated by the remote device, DSS, before it begins recording.

The remote device, DSS, sends an Explicit_Invoke message to the DSS Time Context (05), ProgramTimer Event Object (LL) "setValue of copy_protection IV, "p" (70). The VCR returns a completed token "FE" plus the copy_protection IV value.

The following CAL command is sent from the VCR to the DSS:

"05 LL 45 70 F5 <numeric>"

The command reads as:=<for time context (05), any program timer event object (LL)><setValue (45)><copy_protection IV "p" (70)><delimiter (F5)><numeric>.

The VCR, returns the completed token, "FE". The complete token indicates the setValue Method was executed on the event_data IV. The VCR must verify that it can record the program and that the recording method, digital or analog, is in compliance with the copy_protect IV value. The copy_protect IV values are as follows:

30h=copy allowed
31h=analog copy allowed
32h=1 analog copy allowed
33h=1 digital copy allowed
34h=no copies allowed
35h=unknown The Command is sent with the protocol services:
MT Service Level
APDU Mode: Basic Fixed
APDU Type: Explilcit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High
Error Condition: Copy_Protection IV set to UNKNOWN.

This condition indicates that the copy right limitations are unknown due to a flaw in the, remote device, DSS, program guide or the program is scheduled beyond the limits of the program guide. The remote device, DSS, will update the VCR's program timer copy_protection IV when it is changed to a known state. The VCR may not keep the appointment when the copy protection IV is set to UNKNOWN at the time of the appointment. The VCR must warn the user that the copy right level is UNKNOWN and that the recording may not take place.

Error Condition: Copy_Protection IV not consistant with requested recording mode.

This occurs when the requested recording mode does not comply withe the copy_protection IV level. The remote device, DSS, generates an OSD to indicate the requested record level is not allowed and indicates alternative method.

When digital recordings are not pemitted but analog recordings are permitted, the remote device, DSS, prompts the user to the analog option. If the user does not choose the analog option the program timer event object is reset and the appointment is erased in the VCR by the remote device, DSS.

STEP 4: Program Event Schedule Conflicts

The remote device, DSS, checks for schedule conflicts between events in both the remote device and VCR. It also verifies that the conflicts are unique.

The remote device, DSS, sends an Explicit_Invoke message to the VCR Time Context (05), Program Timer Event Object (LL), "getValue of event_conflict IV, "t" (74).

The following CAL command is sent from the remote device, DSS, to the VCR:

"05 LL 43 74"

The command reads as:=<for time context (05), any program timer event object (LL)><getValue (43) event_conflict IV "t" (74)>

The VCR returns a completed token "FE" plus the event_conflict IV value.

Example

For Timer Context (05h) Program Event Timer objects (03h)–(0Ah), assume objects (05h) and (0Ah) in the remote device, DSS, and VCR objects (03h), (06h),and (07h) are in conflict with new event stored in VCR object (04). Also, the event stored in the VCR program event timer object (06h) has the same remote_ua dn remot_hc as the new event stored in VCR object (04h). The remote device, DSS, sends the CAL Command: "00 04 43 74"

The VCR returns the completed token, "FE", and the numeric timer_number IV values for objects 03 and 07: "FE 30 31 30 35"

The Command is sent with the protocol services:
MT Service Level
APDU Mode: Basic Fixed
APDU Type: Explilcit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High The DSS then generates an OSD to indicate that the DSS program event timers 3 and 8 and VCR program timer events 1 and 5 are in conflict. The VCR program event timer 4, stored in object (04h) is not indicated since it is duplicated in the DSS.

The next section describes known error states developed from an attempt to set up a program timer event from the DSS.

Error State: DSS Program Event Object Unavailable

If all the DSS program events are in use the DSS does not add the new event.

Action: The DSS generates an OSD indicating the DSS program scheduler is full. The event not added to the VCR event list.

User Action: The user must delete a DSS event before proceeding.

Error State: VCR Program Event Object Unavailable

If all the VCR program events are in use, the VCR does not return the object number of an available program event object.

Action: The DSS generates an OSD indicating the VCR program scheduler is full. The added event is deleted from the DSS event list.

User Action: The user may delete a DSS event scheduled on the VCR or change to the VCR User Interface and delete a program.

Error State: Program Event Schedule Conflicts

When the DSS schedules a program in the VCR and there is a conflict in either the VCR or DSS, the program event is placed in both the VCR and DSS. The VCR returns event object number(s) to indicate that there is a schedule conflict.

The DSS generates an OSD indicating what programs are in conflict.

Action: VCR Reports that there is a schedule conflict and the event numbers with the conflict User Action: The VCR User Interface allows the user to either ignore the event conflict or delete the newly scheduled DSS event.

Error State: Program Event Schedule Conflicts

When the VCR schedules a program in the DSS and there is a conflict in either the VCR or DSS, the program event is placed in both the VCR and DSS. The DSS returns event object number(s) to indicate that there is a schedule conflict. The VCR generates an OSD indicating what programs are in conflict.

Action: DSS reports that there is a schedule conflict and the event numbers with the conflict. The VCR must display the conflicting events and indicate the location of the events.

User Action: The VCR User Interface allows the user to either ignore the event conflict or delete the newly scheduled DSS event.

The interaction between the DSS and VCR to execute a programmed timer event is described next.

For a DSS digital record timer event, the DSS requests information to determine VCR availability to make a recording. The error and conflict resolution function involves the detection of a schedule conflict, VCR and DSS operational states, and tape availability. The record macro function involves setup of the VCR input, to either analog or DAV inputs, instructing the VCR to begin recording, verifying the VCR is in the record mode, and tuning the DSS to the appropriate channel, (making a purchase if necessary).

The DSS request VCR availability and Tape Type. The DSS will switch the A/V switch to DSS Video and prepare the VCR to receive a digital bit stream. The error handling checks for Tape Type miss-match, VCR in use, or VCR not on the bus (no response) errors.

The VCR and DSS availability's to keep the event appointment is verified during a time period before the event time. This allows user intervention to deal with VCR and DSS state conflicts. During the typical programmed event both the VCR and DSS are turned OFF. Several minutes before a DSS appointment, the DSS will send Command 1.

The steps for the DSS to initiate a program event with the DVHS-VCR are as follows.

STEP 1 Command: VCR availability determination

The DSS determines the VCR availability before the appointment. The DSS sends an Explicit_Invoke getValue method to the VCR Universal context (00h) Node Control Object (01h) power instance variable 'w' (77h) and Media Transport context (11h) Transport Mechanism Object (03h) instance variables 'C' (43h) (motion_mode), '1' (6Ch) (medium_load), 'm' (6Dh) (medium), 'w (77) (write_protected), Display context (13h) Output Source Switch object (02h) instance variable 'C'.

"00 01 43 77 F9 11 03 43 43 FB 43 6C FB 43 6D FB 43 77 F9 13 02 43 43"

The Command is sent with the protocol services:
MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High When the VCR is setup correctly it returns the values:
"00 F5 30 F5 01 F5 31 30 32 F5 00 F5 39"

This indicates the VCR is in the OFF states), the VCR is in the STOP mode, a tape is loaded, a digital tape is loaded m="31 30 32", the tape is not write protected, and the VCR output video source switch=AVR1 {DSS}.

Exception handling in Step 1 is addressed as follows.

Tape Not Loaded

If the DSS is on, the DSS outputs an OSD indicating a DSS program timer event is about to occur and that no tape is loaded in the VCR. It also request the User to load a Digital Tape. If a tape is not loaded into the VCR the DSS deletes the program timer event from the schedules and places a failure notice in the DSS mailbox. If the VCR is on and the VCR output video switch is not set to AVR1, the VCR displays an OSD indicating that a DSS program timer event is about to occur and that no tape is loaded in the VCR.

Analog Tape Loaded

If the DSS is on, the DSS outputs an OSD indicating a digital recording mode DSS program timer event is about to occur and that that VCR is loaded with an Analog only tape. The DSS waits for the user to repond and indicate that a digital tape had been loaded or to make an analog recording. There are three possible outcomes:

1) If the user responds that the recording should take place with the analog tape, the DSS changes the appointment to an analog recording. This information is sent from the DSS to the VCR.

2) If the user responds to cancel the appointment, the DSS deletes the appointment from both the VCR and DSS program timer events list.

3) If no response is given the DSS assumes that the user desires an analog recording to take place. At the record time the DSS request the type of tape loaded in the VCR and then makes the appropriate recording, (digital or analog).

If the VCR is turned on and the VCR output video switch is not set to AVR1, the VCR must initiate the OSD messages to determine if the recording should proceed as an analog recording or be cancelled. There are three possible outcomes:

1) If the user responds that the recording should take place with the analog tape, the VCR changes the appointment to an analog recording. This information is sent from the VCR to the DSS.

2) If the user responds to cancel the appointment, the DSS deletes the appointment from both the VCR and DSS program timer events list.

3) If no response is given the VCR assumes that the user desires an analog recording to take place. At the record time the DSS request the type of tape loaded in the VCR and then makes the appropriate recording, (digital or analog).

Read Only Tape Loaded

If the DSS is on, the DSS outputs an OSD indicating a record timer event is about to occur and that a Read Only Tape is loaded. The user must indicate the recording can be cancelled or kept. If the user indicates the recording appointment should be kept DSS sends a command to cause the VCR to eject the read only tape. If there is no response the DSS cancels the recording appointment.

If the VCR is turned on and the VCR output video switch is not set to AVR1, the VCR initiates an OSD messages indicating a record timer event is about to occur and that a Read Only Tape is loaded. The user may indicate the recording can be cancelled or kept. If the user indicates the recording appointment should be kept the tape is ejected. If there is no resonse the VCR cancels the recording appointment.

VCR Output Display Source Switch<>AVR1

If the display switch is the only error, the DSS sets the VCR Output Display Source Switch to AVR1 and continues on to Step 2.

If other setup errors are present, the VCR is responsible for display of OSD messages indicating conditions: Tape Not Loaded, Analog Tape Loaded, Read Only Tape Loaded, and Tape motion Mode<>STOP.

Tape motion_mode exception handling

The DSS determines if timer event should override the ongoing VCR state.

If tape motion_mode=STOP, the DSS generates an OSD asking if the appointment should be kept. If the user enters NO then the DSS deletes the appointment from both the DSS and VCR. A non-response is defaulted to YES.

If the VCR output video switch is not set to AVR1, the VCR must also generate an OSD asking if the appointment should be kept. If the user enters NO then the VCR will detete the appointment from the DSS and VCR. A non-response is defaulted to YES.

If tape motion_mode=RECORD, the DSS determines if the VCR is executing a previously scheduled program timer event. If it is executing a previous event timer the DSS will pre-empt the ongoing event at the appropriate time. The DSS sends an Explicit_Invoke message to all Data Memory class objects (16) in the VCR Time Context (05) requesting "getValue of current_status "C" (43)" and getValue of Medium Transport Context (11) Transport Mechanism Object (03) "motion mode", "C" (43) IV. All the Program Timer Event Objects return FE and the value of their current status. The Medium Transport context returns the completed token, "FE" and the motion mode IV value. The following CAL command is sent from the VCR to the DSS:

"05 00 16 43 43 F9 11 03 43 43"

The command reads as:=<for time context (05), any (00) event timer class object (16)><getValue (43)<current status "C" (43) End_of_Cmd (F9)><getValue (43) motion_ mode, "C" (43)>

Example

For Timer Context (05h) Program Even Timer objects (03h)–(0Ah), assume object (04h) is executing a program timer event. The response from the DSS is:
FE 30 FE 32 FE 30 FE 30 FE 30 FE 30 FE 30 FE 30 FE 31
In this case the Command is sent with the protocol services:
MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High If there are no time slots available the DSS returns "FC FC FC FC FC FC FC FC"
The VCR displays appropriate OSD to indicate either the VCR, DSS or both do not have additional program event timers available.

If the VCR is executing a program timer event then the DSS sets the tape motion_mode=STOP and clears the event from the VCR. The DSS then executes STEP 2.

If tape motion_mode=PLAY, the DSS cancels the event and deletes it from the VCR.

If tape Motion_mode=Other, the DSS cancels the event and deletes if from the VCR.

STEP 2: DSS Hails for DAV Bus Data

At the appointment time, the remote device, DSS, re-verifies that the VCR is ready to carry out the appointment. Upon receipt of the return packet the DSS tunes to the appropriate channel, checks the copy protection level, and hails for the DAV Bus. Channel and sets copy protection variables Step 2.a: VCR Ready The remote device, DSS, queries the VCR to determine if it is ready to carry out the appointment. The DSS sends an Explicit_Invoke getValue method to the VCR Universal context (00h) Node Control Object (01h) power instance variable 'w' (77h) and Media Transport context (11h) Transport Mechanism Object (03h) instance variables 'C' (43h) (motion_mode), '1' (6Ch) (medium_load), 'm' (6Dh) (medium), 'w (77) (write_protected), Display context (13h) Output Source Switch object (02h) instance variable 'C'.

"00 01 43 77 F9 11 03 43 43 FB 43 6C FB 43 6D FB 43 77 F9 13 02 43 43"

The Command is sent with the protocol services:
MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High When the VCR is setup correctly it returns the values:
"00 F5 30 F5 01 F5 31 30 32 F5 00 F5 39"

This indicates the VCR is in the OFF state, the VCR is in the STOP mode, a tape is loaded, a digital tape is loaded m="31 30 32",the tape is not write protected, and the VCR output video source switch=AVR1 {DSS}.

Step 2.b: Copy protection level validation

If required, the remote device, DSS, sends the copy_ protection IV value to the appropriate program timer.

Step 2.c: Hail for the DAV Bus

The remote device, DSS, queries the bus to determine if it can take control of the BUS. The VCR gives up control of the bus unless it is in the play mode. At that time the resource is considered locked. The lock is released when the VCR is taken out of the play mode.

The DSS gives up control of the bus unless it is suppling a bitstream to a VCR that is in the record mode. In that event, the channel is considered locked. The lock is released when the VCR is taken out of the record mode.

Command: The DSS sets the copy protection values in the VCR and hails for the DAV Bus Data Channel.

Step 2: Exception Handling

If the DSS cannot successfully gain access to the DAV Bus, the DSS program timer event defaults to an analog recording.

STEP 3: DSS Initiates Digital Recording

Command: The DSS sends an Explicit_Invoke setValue method to the VCR Universal context (00h) Node Control Object (01h) instant variable 'w' (77h)=ON (power=ON) and Media Transport context (11h) Source Switch (02) instance variable 'C' (43h)=31h 38 (DAV), Transport Mechanism Object (03h) instance variables 'C' (43h)= 01h (motion_mode=record), Display context (13h) Source Switch object (02h) instance variable 'C'=09h (display=AVR1), and sets the VCR DAV Bus receiver to ON.

"00 01 42 77 F9 11 02 45 46 01 FB 03 45 43 01 F9 13 02 45 43 09 (add DAV Bus receiver ON Tokens)"

The Command is sent with the protocol services:

MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High The VCR should return: "FE FE FE FE FE"

Upon receipt of the VCR return message the DSS tunes to the appropriate channel, turns on its DAV Bus Driver and send it to the VCR.

Step 3 Exception Handling

The DSS will complete an analog recording of the program. To perform an analog recording event, the DSS request information to determine VCR availability to make a recording. The error and conflict resolution function involves the detection of a schedule conflict, VCR and DSS operational states, and tape availability. The record macro function involves setup of the VCR input, to either analog or DAV inputs, instructing the VCR to begin recording, verifying the VCR is in the record mode, and tuning the DSS to the appropriate channel, (making a purchase if necessary).

The DSS request VCR availability and Tape Type. The DSS will switch the A/V switch to DSS Video and prepare the VCR to receive a digital bit stream. The error handling checks for Tape Type miss-match, VCR in use, or VCR not on the bus (no response) errors.

The VCR and DSS availability's to keep the event appointment are verified during the five minute time period before the event time. This allows user intervention to deal with VCR and DSS state conflicts. During the typical programmed event both the VCR and DSS are turned OFF. Five minutes before a DSS appointment the DSS will send Command 1 to verify the appointment.

For a digital recording the VCR returns the values: "00 f5 00 f5 01 f5 31 30 31 f5 39" (hex). For an analog recording the VCR can return either: "00 f5 00 f5 01 f5 31 30 31 f5 39" (hex) or "00 f5 00 f5 01 f5 31 30 31 f5 39" (hex). This indicates the instant variables (00h)(01h) w=ON, (11h)(03) C=0, 1=, m=101 (analog) or m=102 (digital or analog) and (13h)(02) C=9 (Audio/Video 1) The VCR is required to send the DSS its Universal (00) Context, Node Control (01) Object, instant variable "w" value each time it changes. During the period following the execution of Macro 1 the DSS would check to see if the VCR changed from the OFF to ON state.

Upon execution of the programmed timer event the DSS hails for access to the DAV bus. After succeeding in gaining access to the DAV bus the DSS sends Command 2: Recording Initiation Command. If the DAV bus is not available the DSS will attempt to make an analog recording of the desired program.

The VCR should return: FE FE FE FE. Upon receipt of the VCR return message the DSS will tune to the appropriate message and send it over the DAV Bus.

Messages sent by DSS to initiate programmed recording are as follows.

Command 1: DSS Appointment Verification. The following CAL command is sent from the DSS to the VCR:

00 01 43 77 F9 11 03 43 43 FB 43 6C FB 43 6D F9 13 02 43 43 An Explicit_Invoke getValue method to the VCR Universal context (00h) Node Control Object (01h) power instance variable 'w' (77h) and Media Transport context (11h) Transport Mechanism Object (03h) instance variables 'C' (43h) (motion_mode), '1' (6Ch) (medium_load), 'm' (6Dh) (medium), Display context (13h) Source Switch object (02h) instance variable 'C'.

The Command is sent with the protocol services:

MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High Command 2: Digital Recording Initiation The following CAL command is sent from the DSS to the VCR:

"00 01 42 77 F9 11 02 45 46 01 FB 03 45 43 01 F9 13 02 45 43 09"An Explicit_Invoke setValue method to the VCR Universal context (00h) Node Control Object (01h) instant variable 'w' (77h)=ON (power=ON) and Media Transport context (11h) Source Switch (02) instance variable 'C' (43h)="31h 38h" (DAV), Transport Mechanism Object (03h) instance variables 'C' (43h)=01h (motion_mode=record), Display context (13h) Source Switch object (02h) instance variable 'C'=09h (display=AV1).

The Command is sent with the protocol services:

MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used DLL Service Level
Service_class: Basic
DLL service: Acknowledged
Addressed service: As required
Include source: Yes
Priority: High
Command 3: Analog Recording Initiation Command.
The following CAL command is sent from the DSS to the VCR:
"00 01 42 77 F9 11 02 45 43 09 FB 03 45 43 01 F9 13 02 45 43 09"An Explicit_Invoke setValue method to the VCR Universal context (00h) Node Control Object (01h) instant variable 'w' (77h)=ON (power=ON) and Media Transport context (11h) Source Switch (02) instance variable 'C' (43h)="09h" (AVR1), Transport Mechanism Object (03h) instance variables 'C' (43h)=01h (motion_mode=record), Display context (13h) Source Switch object (02h) instance variable 'C'=09h (display=AV1).
The Command is sent with the protocol services:
MT Service Level
APDU Mode: Basic Fixed
APDU Type: Explicit_Invoke
NL Service Level
NPDU Type: non-extended service
Routing: Directory
Allowed Media: Not Used
BR1: Not Used
BR2: Not Used
DLL Service Level
Service_class: Basic
DLL service: Acknowledged
Addressed service: As required
Include source: Yes
Priority: High Program timer event execution error states, i.e, error states that may occur during a DSS recording are described next
Error State: DAV Unavailable for Recording
If the DSS box hails for access to the DAV bus and it is not available, the DSS will initiate an analog recording. In this case the DSS sends Command 3, Analog Recording Initiation Command, to the VCR.
Error Stata: VCR turned on but not recording
When the VCR is turned on but not recording and is displaying the VCR video five minutes before a timer event, the VCR generates an OSD indicating a timer event is about to occur and the video source (DSS). If the line input is switched to the DSS the DSS will display an OSD indicating that there is a pending timer event an allow the user to forgo the recording. In the event of no User action the timer event will occur.
Action (1): Five Minutes before a DSS event, the DSS request the VCR On/OFF status and Output Video Switch state.
  (a) If the VCR or DSS is on and displaying DSS video a pending event OSD is generated.
  (b) If the User forgoes the recording, the DSS cancels the event on both the VCR and DSS program timer events list.
  (c) If the User indicates the appointment should be kept then the event occurs without additional user action.
  (d) Else, if there is no response the DSS assumes that the recording should go on as scheduled.
Action (2): If the VCR video switch state indicates VCR video is displayed, the VCR will request the DSS ON/OFF status five minutes before a timer event.
  (a) If either the DSS or VCR is ON the VCR displays a pending event OSD message.
  (b) If the User indicates the appointment should be kept then the event occurs without additional user action.
  (c) If there is no response the VCR assumes that the recording should go on as scheduled.
  (d) If the User forgoes the event the VCR deletes the event from the DSS and VCR program timer events list.
  (e) Else, if there is no response the VCR assumes that the recording should go on.
Action (3): If the VCR or DSS change froni the OFF to ON states during the period five minutes before a recording event, the DSS and VCR repeat steps (1) and/or (2) to determining if they keep the event appointment.
User Action: The User may forgo the recording by responding to the OSD. If the User does not respond then the recording will be allowed to occur.
Error State: VCR in on and recording
When the VCR is turned on and recording and a timer event occurs:
Action (1)
  a) If it is a DSS timer event, the DSS determines if the ongoing recording is due to a VCR program timer event.
  b) If record state is due to an ongoing program timer event, the DSS keeps the appointment and the VCR allows the DSS to change appropriate VCR instant variables.
Action (2)
If it is a VCR timer event, the VCR keeps the appointment.
Action (3)
If the record state is not due to a program timer event, the VCR does not keep the appointment.
Error State: No Tape Loaded
When the timer event appointment is made, if there is no tape is loaded the VCR generates a status message back to the scheduler and indicates no tape is loaded and the appropriate tape type. The DSS generates an OSD indicating no tape is loaded in the VCR and indicating appropriate tape type for the requested recording.
Error State: Read Only Tape Loaded
When the timer event appointment is made, if a Read Only Tape is loaded in the VCR, the VCR generates a status message back to the scheduler indicating that the tape is a read only tape. The DSS generates an OSD indicating that the tape is a read only.
Error State: Record Mode Tape Type Miss Match
When a digital recording is requested and a VHS tape is loaded in the VCR the DSS and VCR will make an analog recording.

For an immediate digital record event with DSS source, two immediate digital record modes are available. In automatic mode the VCR record button is linked to a default bit stream generator. When the VCR Record function is initiated and there is no bit stream present the VCR initiates a record secession with the default device. The default device can be any bit stream generating device and is set up in the VCR User Interface. In dubbing mode the VCR may also make a recording of a bit stream already present on the DAV bus. This allows for dubbing between DVHS-VCRs and reception of other bit streams. There are two display possibilities. First, if there is a DSS present in the system, the DSS may be instructed to decode and display the DAV bit stream through the VCR's AVR1 even thought it is not the originator of the bit stream. This allows two VCR's to be hooked up to a single DSS and have the digital playback video to be routed through one VCR AV switch.

For automatic recording when the VCR record mode is set to digital, a digital tape is loaded, and there is no digital bit stream present on the bus, the VCR initiates a digital recording upon receipt of a an IR or Front Panel Record command.

For DAV bit stream source recording, the VCR initiates a digital recording with the default recording device. The VCR instruct the default device to inherit the DAV bus and begin sending its digital bit stream. The VCR also ask the source device to supply relevant copy protect information. Step 1: The VCR sends an Explicit_Invoke message to cause the Default device, DSS, to inherit the DAV data bus if the copy protection allows for recording. The return value is used to indicate if the DAV bus was locked or the program was copy protected.

If (56)<copy protect variables><equal><value><>

The command reads as:=<for DAV transceiver context (04), driver object (02)><if (56)<copy protect variables> (43) equals (E8) (value)><Begin (F7)><inherit (54)>F5 (delimiter)<data channel ( )><F5 (delimiter)><F4 31 F6 26 >exit (52) (return value)<else getvalue( )><(copy protect variables)<END (F8)>

Step 2: The default device, DSS, checks the copy protect mode of the video bit stream and determines if it is permissible to make a copy. If digital copies are permitted then the default device hails for the DAV bus. Otherwise the command is rejected.

The source device must keep track of the number of receivers making digital copies and protect the bit stream from illegal copies. If the copy protection information changes the source device must determine if the bit stream can be copied and act to prevent illegal copies.

Step 3: The default device, DSS, turns no the DVHS-VCR DAV Bus receiver and instructs the VCR to go into the record mode.

Step 4: The VCR checks the copy protect mode of the video bit stream to verify that it is legal to make a digital copy. Every five minutes the VCR request copy protect information to insure it is making legal copies.

For setup of default bit stream source device, during initial setup, the VCR hails the bus to determine what devices may act as bit stream sources on the DAV medium. Initially, the VCR uses the first DAV bit stream source device it locates as the default. The list of DAV bit stream source devices is used in the program timer event guide.

The VCR User Interface is used to determine which product is the default. The VCR User Interface may update this list by forcing the VCR to re-acquire the DAV bit stream device information. During the re-acquire process the default is not changed unless the default device is not found. If the old default device is not found the first DAV bit stream source device detected becomes the default.

For dubbing (recording when bit stream is already present), the VCR will initiate a dubbing digital recording upon receipt of a IR Record command if the VCR is in the digital record mode, a digital bit stream is already present on the DAV bus, and a digital tape is loaded.

Before recording, the VCR broadcasts to see what is the source device on the DAV Bus and request copy protect information. Every five minutes the VCR request an update of the copy protect information.

The source device must keep track of the number of copies being recorded and protect the bit stream from illegal copies. If it is legal to copy the bit stream the source device instructs the VCR to turn on its DAV receiver and to go into the record mode. Otherwise it instructs the requesting VCR to turn off its DAV receiver and stop recording.

The error or exception handling states are as follows
Error State: DAV Bus not available
Error State: Digital bit stream video not being displayed through VCR.
Error State:Copy Protected Bit stream
Error State: No Tape Loaded When a VCR Digital Record command is received and the VCR does not have a tape loaded the DSS displays an OSD indicating that no tape is loaded. The VCR is responsible for display of the no tape message when an analog recording is requested.

ACTION: VCR reports no tape loaded to the DSS
Error State: Read Only Tape Loaded When a record command is received and Read Only Tape is loaded the command is rejected and the DSS generates an OSD indicating that the tape is a read only.

ACTION: VCR reports read only tape loaded to the DSS
Record Mode Tape Type Miss Match When a VHS tape is loaded and the VCR default recording mode is set to digital and a record command is initiated the VCR will inform the DSS that it is in the record mode, that a analog tape is loaded and that the record mode is digital. The DSS will then display an OSD indicating a tape type mismatch and ask if the user wants to proceed with an analog recording. If the user declines then the DSS displays a message indicating what tape format must be loaded into the VCR. Else, the DSS sends the VCR a record command and sets the record method to analog.

ACTION: VCR reports the tape type and default record mode to the DSS. The DSS displays appropriate OSD and upon users command initiates an analog recording.

For an immediate analog record event with DAV bus attached, the VCR will initiate an analog recording upon receipt of a IR Record command.

For CEBus automatic recording, when the VCR record mode is set to analog and a tape is loaded, the VCR initiates an analog recording upon receipt of an IR or Front Panel Record command.

For DSS source recording, the VCR initiates an analog recording with the default recording device. The VCR instruct the default device to inherit the DAV bus and begin sending its digital bit stream. The VCR also ask the source device to supply relevant copy protect information. Step 1: The VCR sends an Explicit_Invoke message to cause the Default device, DSS, to inherit the DAV data bus if the copy protection allows for recording. The return value is used to indicate if the DAV bus was locked or the program was copy protected. If (56)<copy protect variables><equal><value><>

The command reads as:=<for DAV transceiver context (04), driver object (02)><if (56)<copy protect variables >(43) equals (E8) (value)><Begin (F7)><inherit (54)>F5 (delimiter)<data channel ( )><F5 (delimiter)><F4 31 F6 26 >exit (52) (return value)<else getvalue( )><(copy protect variables)<END (F8)>

Step 2: The default device, DSS, checks the copy protect mode of the video bit stream and determines if it is permissible to make a copy. If digital copies are permitted then the default device hails for the DAV bus. Otherwise the command is rejected.

The source device must keep track of the number of receivers making digital copies and protect the bit stream from illegal copies. If the copy protection information changes the source device must determine if the bit stream can be copied and act to prevent illegal copies.

Step 3: The default device, DSS, turns no the DVHS-VCR DAV Bus receiver and instructs the VCR to go into the record mode.

Step 4: The VCR checks the copy protect mode of the video bit stream to verify that it is legal to make a digital copy. Every five minutes the VCR request copy protect information to insure it is making legal copies.

For setup of default bit stream source device, during initial setup, the VCR hails the bus to determine what devices may act as bit stream sources on the DAV medium. Initially, the VCR uses the first DAV bit stream source device it locates as the default. The list of DAV bit stream source devices is used in the program timer event guide.

The VCR User Interface is used to determine which product is the default. The VCR User Interface may update this list by forcing the VCR to re-acquire the DAV bit stream device information. During the re-acquire process the default is not changed unless the default device is not found. If the old default device is not found the first DAV bit stream source device detected becomes the default.

For dubbing (recording when bit stream is already present), the VCR will initiate a dubbing analog recording upon receipt of a IR Record command if the VCR is in the analog record mode and a tape is loaded.

The source device must keep track of the number of copies being recorded and protect the bit stream from illegal copies. If it is legal to copy the bit stream the source device instructs the VCR to turn on its DAV receiver and to go into the record mode. Otherwise it instructs the requesting VCR to turn off its DAV receiver and stop recording.

Error or exception handling states are as follows.
Error State: Copy Protected Bit stream
Error State: No Tape Loaded
When a VCR Digital Record command is received and the VCR does not have a tape loaded the DSS displays an OSD indicating that no tape is loaded. The VCR is responsible for display of the no tape message when an analog recording is requested.
ACTION: VCR reports no tape loaded to the DSS
Error State: Read Only Tape Loaded
When a record command is received and Read Only Tape is loaded the command is rejected and the DSS generates an OSD indicating that the tape is a read only.
ACTION: VCR reports read only tape loaded to the DSS For an immediate playback request, the VCR will initiate a play back of a digital tape upon receipt of a Play command when the DVHS-VCR is loaded with a digital tape. After receipt of the play command, the VCR will verify that a digital tape is loaded and switch the DSS digital port to receive the VCR input. If the DSS is off the VCR turns it to the ON state.
ACTION: VCR turns the DSS to the ON state and sets the digital input port to receive data.
Error State: DSS is in a Previous Scheduled Record Mode
If the DSS is in use to make a recording the DSS returns an error message.
ACTION: DSS returns an error message that it is unable to comply with the VCR action.

Next, general clock update rules, i.e., specific operational rules governing the clock and time update functions of the DSS-DVHS interface, will be described.
Initialization Clock Setup
Upon power up and bus initialization, the VCR locats best time source and request the time and date instant variables.

The VCR makes an BROADCAST explicit invoke Unacknowledged Service: If Time Context (05) Real Time Object (02) time_source device_class=DBS then getArray current time "C". The return result will be FC from non-DBS sources. Any clock with a DSS derived clock source returns: FE<Data element>If there are no returns then the VCR attempts to locate an alternative CEBus clock source by BROADCASTING an Explicit Invoke Unacknowledged Service: Time Context (05) Clock class Object (1D) If time_source<>0 then getValue current_time:
ACTION: VCR request return of unit address of DSS products on the CEBus and for the DSS time context clock object instance variables current_time, current date string and day.

For automatic time and date setup, the VCR will update the time context clock object (02 Real Time) instance variables "C" (current_time), "e" (current date string) and "d" (day) upon determination that a power line failure has occurred.

The VCR will also update the time context clock object (02 Real Time) instance variables "C" (current_time), "e" (current date string) and "d" (day) upon successful scheduling of a programmed timer event and receipt of each Power ON command from either the IR, front panel or CEBus control channel.

For user initiated time and date update, upon request of the user from the VCR setup menu, the VCR will request the DSS to return the value for all supported time context clock object 2 (Real Time) instance variables. Also, the user can point to a specific CEBus clock element that he wants to control the VCR clock Next, bus initialization upon power up is described. More specifically, the CEBus initialization process to provide plug and play capabilities is described.

Allocation of addresses is a significant function of CAL. The Node Control Object of the Universal Context is responsible for management of the three types of addresses in the CEBus network, MAC Addresses, System Addresses or house codes, and Group addresses. The DSS3 determines its MAC address and house code either statically or dynamically. In a dynamic device the house code is determined by asking other devices within the home for their system address, and the MAC address is determined by selecting an address not currently used in that house. In a static device, the addresses are not determined by interaction with the home network, but by some other means, such as user determined or factory preset.

This section involves static house code and address setup and describes the default House Code and Address acquisition used to insure plug and play between the VHS and other CEBus units.

The VCR must be able to broadcast messages to all of the devices on the DAV media (Simplified Digital A/V connector). This is accomplished by using a MAC address of 0000 along with the house code address of the system. All devices must be able to respond to the broadcast MAC address 0000. All un-configured devices must acquire a MAC address. Once acquired, an address must not be lost during a power interruption.

The default (factory set) house code is set to the zone address 0001. This address is stored in the EPROM memory and must be maintained during a power interruption.

For default address generation, upon initial power up, the VCR is unconfigured. The VCR must acquire a Unit address by hailing and inform other devices of its existence. Once acquired, this address is stored in EPROM memory. The address must be maintained during a power interruption. The Unit address is acquired using the hailing method.

User entered house code and address generation is also possible. The User may enter the Desired House Code from the Setup Menu. Upon setting the House code the device can either Hail for a Unit Address or be assigned an address. If it is assigned an address it then must using hailing to insure it is a unique address.

The user may also initiate a reset to a factory preset house code and initiate address generation. That is, the User may force the VCR to reset the House Code to 0001h and re-acquire a new Unit Address.

Dynamic setup conditions involve the VCR being able to acquire a house zone (also referred to as a house code) address and a unique Unit address.

The VCR must act as a settable Node when acquiring a House Code. To acquire a house code, the User places the VCR into a Settable Node state from the setup menu. While in this state the VCR hails for a temporary Unit Address and then request the Configuration Master to send its House Code. If no house code is obtained the user in informed that the Configuration Master has not sent the house code and instructed to re-initiate the Configuration process. Generating a unit address occurs once the VCR has obtained a valid House Code. It uses the hailing process to obtain a unique Unit Address.

In response to a time update request from other nodes, the VCR will return its clock value, located in the Time Context (05) Real time Object (02) current timer instant variable, to a device upon request.

C (43)* current_time R/W numeric

The Current_time instant variable contains the present local time in the VCR Real time Object. The data is a 13 byte numeric: yy_mm_dd_ hh_mm_ss_w (year, month, day, hour, minute, second, day of week). Stimulus methods for initiating a time update are as follows.

getValue (43h) o: Upon receipt of getValue the VCR returns the ASCII value corresponding to the current time.

setValue (45h) o: If the run_edit IV is set to zero and a setValue method and a valid numeric value is received, the VCR sets the current_position IV to the updated value. If the value is not allowed an error message is generated.

All other methods are ignored and an Error Message is returned.

The next section describes aspects of DVHS-VCR initiated playback and recordings. First, playback setup, i.e., means of linking the VCR Play function to a digital bit stream decoder or recording device, is described.

To provide a default playback device, the default (factory set) is set to the zone address 0001. This address is stored in the EPROM memory and must be maintained during a power interruption.

Upon initial power up, the VCR is unconfigured. The VCR must perform default playback device validation, i.e., verify that the default device playback device is capable of decoding the DAV bus digitial bitstream. The VCR broadcasts for all DAV bus capable devices.

Alternatively, the User may enter the Desired playback target device.

Also, the User may force the VCR to reset the playback device target to the factory default.

Dynamic setup involves the following. The VCR must be able to acquire a Playback Device, determine what devices are DAV capable, acquire DAV Capable address and capabilities information, determine best display device, and determine best Dubbing device.

Next, record setup is described, that is, the means of linking the VCR Record function to a digital bit stream provider device.

The default (factory set) is set to the zone address 0001. The default device is a DSS unit with an address of XXXX. This address is stored in the VCR ROM as the default value and uploaded into EPROM memory upon initial power up and when the machine is reset.

Default record device validation is needed. Upon initial power up, the VCR is unconfigured. The VCR must verify that the default decoder device is present and capable of decoding the DAV bus digitial bitstream. The VCR broadcast for all DAV bus capable devices.

User setup of the playback device is accomplished by the User may entering the desired record target device.

The User may force the VCR to reset the record device target to the factory defaults.

As part of dynamic setup, the VCR must be able to acquire a Record Device, determine what devices are DAV capable, acquire DAV Capable address and capabilities information, and determine appropriate bitstream source device.

RF Switch Control is described next with DSS recording being addressed first. In particular, the means of linking the VCR and DSS RF switch functions for displaying a DSS program is described.

To provide a default recording device, the default (factory set) is set to the zone address 0001. The default device is a DSS unit with an address of XXXX. This address is stored in the VCR ROM as the default value and uploaded into EPROM memory upon initial power up and when the machine is reset.

Next, the means of linking the VCR Record function to a digital bit stream provider device is described as part of DSS playback. The default (factory set) is set to the zone address 0001. The default device is a DSS unit with an address of XXXX. This address is stored in the VCR ROM as the default value and uploaded into EPROM memory upon initial power up and when the machine is reset.

VCR display switch control is described next. First, the means of linking the VCR analog record and OSD functions to the DSS are described as part of the OSD display for analog recording via the VCR.

For default OSD Generation for digital recording, the default (factory set) is set to the zone address 0001. The default device is a DSS unit with an address of XXXX. This address is stored in the VCR ROM as the default value and uploaded into EPROM memory upon initial power up and when the machine is reset.

Another aspect of the system that will now be described is resource hailing. Hailing is a scheme through which a device gains access to network resources, such as data channels or even its own MAC address. Using this scheme, a device queries other devices on the network to determine if a particular resource is in use.

The general case of resource hailing uses the if method to determine if one or more other nodes on the network are using a particular resource. The if method tests if an IV in one or more other nodes contains the desired resource. If so, the other node(s) return a result with a result code of 8 (Resource in use).

A typical example is the hailing required to acquire a data channel. To acquire the DAV data channel, a node will query the network to see if the DAV bus is in use. To hail for DAV, the following CAL command is used:

04 2F 56 43 E8F4 31 F6 01 F7 52 38 F8

In the Data Channel Context (04) the DAV transmitter Object (2F) if ('C' EQ

1) BEGIN exit 8 END This command is sent to the Data Channel Context (04), Data Channel Transmitter object class (2F), using the local House Code, and broadcast Unit Address (0000). The command should be sent with the following protocol services:

MT Service Level
APDU Mode: Basic Fixed
APDU Type: Conditional_Invoke
NL Service Level
NPDU Type: non-extended service
Routing: Directory
Allowed Media: All
BR1: As Required
BR2: Not Used
DLL Service Level
Service_class: Basic
DLL service: Unacknowledged
Addressed service: As required
Include source: No
Priority: High If one of the receiving nodes is currently using the DAV bus, the exit method will be executed and will generate a completed response with the argument 8, indicating to the originating device that the selected band is unavailable. The response message (FE 38) is generated with an MT_RESULT request primitive from CAL to the Message Transfer Element. Resource hailing requests such as this, sent to the broadcast address, should be repeated if a response is not received within 1 seconds (the worst case network round trip delay). If no response is received on the second attempt, also after an 1 second delay, the resouce can be assumed to be available.

This technique can also be used to hail for a Unit Address, House Code, Group Address, or any other value on the network. If hailing for a Unit Address, an abbreviated version of hailing technique can be used since the address being hailed for can be used in the destination address field of the hail packet. For example, to hail for a Unit Address of 0037, the only CAL command necessary is: 00 01 52 38. This command is sent to the local House Code, Unit Address 0037, the Node Control Object (01) in the Universal Context (00), to execute the exit method (52) with an argument of 8. If any node within the House Code used has Unit Address 0037, it will execute the message and return a response message (FE 38). The protocol services used should be the same as the previous example, except that an APDU type of Explicit_Invoke should be used.

The next section lists and defines the contexts associated with the described system.

Universal Context 00
(01h) Node Control Object

This context contains the Node Control Object and is present in all CEBus compliant products.

| 1 | Node Control Object | | | (01) Node Control |
| --- | --- | --- | --- | --- |
| Required storage object of Universal Context | | | | |
| IV | R/W | Type | Name | Context Function |
| w(77) | R/W | b | power | device power, 0 = OFF, 1 = ON |
| n(6E) | R | c | manuf_name | manuf. product name |
| m (6D) | R | c | manuf_model | manuf product model |
| c(63) | R | n | product_class | Product class number |
| p(70) | R/W | c | product_name/location | location of product in house |
| h(68) | R/W | d | system_address | 16 bit system address |
| a(61) | R/W | d | mac_address | 16 bit unit address |
| b(62) | R | n | capability_class | 0 |
| reset | R/W | b | reset | resets device to factory defaults |

-continued

| 1 | Node Control Object | | | (01) Node Control |
| --- | --- | --- | --- | --- |
| Required storage object of Universal Context | | | | |
| IV | R/W | Type | Name | Context Function |
| o(4F) | R | d | context_list | list of used contexts in product |
| f(66) | R/W | b | configured | 1 = address configured |
| i(69) | R | n | setup | used during configuration |
| u(75) | R/W | n | user_feedback | user interface IV during config. |
| d(64) | R | d | source_unit_addr | unit addr. of last received pkt |
| e(65) | R | d | source_system_addr | system addr of last received pkt |
| v(76) | R | c | conformance_level | CIC conformance level |
| k(6B) | R/W | d | authentication keys | one or more keys |

(02h) Context Control Object

This context contains the Node Control Object and is present in all CEBus compliant products.

| 02 | Context Control Object | | | (02) Context Control |
| --- | --- | --- | --- | --- |
| The context control object for this context. | | | | |
| IV | R/W | Type | Name | Context Function |
| o (6Fh) | R | d | object_list | list of objects used in context |

Medium Transport Context 11h (01h) Context Control: Context Control Object 02

| 01 | Context Control Object | | | (02) Context Control |
| --- | --- | --- | --- | --- |
| The context control object for this context. | | | | |
| IV | R/W | Type | Name | Context Function |
| o (6Fh) | R | d | object_list | list of objects used in context 02 09 03 11 05 09 0C 1C |

(02h) Source Switch: Multi_position Switch Object 09

| 02 | Source Switch Object | | | (09) Multi_position Switch Object |
| --- | --- | --- | --- | --- |
| The source switch determines what signal is stored on the tape. | | | | |
| IV | R/W | Type | Name | Context Function |
| C (43) | R/W | n | current_position | Default = 17 (TUNER1) |
| n (6E) | R | n | number_positions | 4 |
| F (66) | R/W | n | list of switch positions | |
| "54 50 52 31 20 20 20 20" | | | "33 38" = DAV(38) | DAV |
| "41 56 52 31 20 20 20 20" | | | "30 39" = AVR1(9) | AVR1 |
| "54 55 4E 45 52 31 20 20" | | | "31 37" = TUNER1(17) | Tuner 1 |
| "46 52 4F 4E 54 20 20 20" | | | "32 32" = FRONT(22) | Front Panel |

03 Transport Mechanism: Medium Transport Object 11h

| 03 | | | Transport Mechanism | (11) Medium Transport |
|---|---|---|---|---|
| | | | The Transport Mechanism models the VCR tape resource and is responsible for tape motion, mode, and type information and states. | |
| IV | R/W | Type | Name | Context Function |
| p (50) | R/W | b | pause_mode | 0 = not paused<br>1 = paused |
| C (43) | R/W | n | motion_mode | 0 = stop (default)<br>1 = record<br>2 = slow play<br>3 = play<br>4 = play backwards<br>5 = scan forward<br>6 = fast forward<br>7 = scan backward<br>8 = rewind |
| i (69) | R/W (3) | n | index | 0 = index search disabled<br>Other indicates index marks to move/play on. Transport will enter appropriate mode (play/stop) when index mark reached. |
| l (6C) | R/W | b | medium_load | 0 = empty<br>1 = loaded. |
| n(6E) | R | b | non_writeable | "00 h" = read/write tape<br>"01 h" = write protected tape |
| m (6D) | R | n | medium | 101 = VHS<br>102 = SVHS |

(05h) Transport Speed: Multi_position Switch Object 09

| 05 | | | Transport Speed Object | (09) Multi_position Switch Object |
|---|---|---|---|---|
| | | | The source switch determines record tape speed. | |
| IV | R/W | Type | Name | Context Function |
| C (43) | R/W | n | current_position | Two bytes lone;<br>Default = 4;<br>permissable numeric values are 4, 5, 6, and 38. Values are in ASCII format. |
| n (6E) | R | | number_positions | 4 |
| F (46) | R/W | n | list of switch positions | |
| "53 50 20 20 20 20 20" | | | 4 = SP | Standard Play |
| "4C 50 20 20 20 20 20" | | | 5 = LP | Long Play |
| "45 50 20 20 20 20 20" | | | 6 = EP | Extra Long Play |
| "44 41 56 20 20 20 20" | | | 38 = DAV | Digital Audio Video Bus |

(09) Counter Object: Counter Control Object 1C

A general purpose counter or timer object model. Used to model an up or down counter, pre-settable to a count with count enable/disable. Used to count events (count UOM), seconds (elapsed time), etc. Also used to model a timer which counts up or down counting units of time (usually seconds) depending on application.

| 09 | | | Counter Object | (1C) Counter Object |
|---|---|---|---|---|
| | | | The counter object for this context. | |
| IV | R/W | Type | Name | Context Function |
| e (65) | R/W | b | count_enable | enables or disables the counter |
| u (75) | R/W | b | up_down | count up = 1 or down = 0 |
| U (55) | R/W | n | units_of_measure | units of measure of the timer in the context selected. |
| C (43) | R/W | n | current_count | the current count in count units. |
| t (74) | R/W | n | target_count | the terminal count for current_count |

Anti-dubbing object

| 0A | | | Anti-Dubbing Object | (09) multi-state switch |
|---|---|---|---|---|
| IV | R/W | Type | Name | Context Function |
| C (43) | R/W | n | Current_copy | 30h = copy allowed<br>31h = analog copy allowed<br>32h = 1 analog copy allowed<br>33h = 1 digital copy allowed<br>34h = no copies allowed<br>35h = unknown |
| n F(46) | R R | n n | | |
| "43 4F 50 59 20 20 20 20" | | | 0 = COPY | copy allowed |
| "41 4E 41 4C 43 4F 50 59" | | | 1 = ANALCOPY | analog copy allowed |
| "31 41 4E 41 4C 43 50 59" | | | 2 = 1ANALCPY | one analog copy |
| "31 44 49 47 43 4F 50 59" | | | 3 = 1DIGCOPY | one digital copy |
| "4E 4F 43 4F 50 59 20 20" | | | 4 = NOCOPY | No copies allowed |
| "55 4E 4B 4E 4F 57 4E" | | | 5 = UNKNOWN | Unknown copy right privilege |

Tuner Context 12h
NTSC Tuner on DVHS-VCR
(01h) Context Control: Context Control Object 02

| 01 | | | Context Control Object | (02) Context Control |
|---|---|---|---|---|
| | | | The context control object for this context. | |
| IV | R/W | Type | Name | Context Function |
| o (6F) | R | d | object_list | list of objects used in context |
| | | | 03 09 04 09 06 09 07 0A | |

Chanel Tuning: Multi_position Switch Object 09

| 03 | | | Channel Tuning | (09) Multi_position Switch Object |
|---|---|---|---|---|
| | | | The Channel Tuning Object controls the NTSC tuner selection. | |
| IV | R/W | Type | Name | Context Function |
| C(43) | R/W | n | current_position | IS-132 channel number, AFT will be performed |
| n(6E) | R | n | number_positions | |

Band Switch: Multi_position Switch Object 09

|  |  |  |  | Multi_position Switch |
|---|---|---|---|---|
|  | Band Switch |  |  | Object |
| 04 | The source switch determines tuning mode. | | | |
| IV | R/W | Type | Name | Context Function |
| C(43) | R | n | current_position | 2 = Air/Broadcast mode, 3 = CATV mode |
| n(6E) | R | n | number_positions | (32h), ASCII for value of 2. |

(06h) Mode Switch Object: Multi_position Switch Object 09

|  |  |  |  | (09) Multi-state |
|---|---|---|---|---|
|  | Mode Switch Object | | | Sensor Object |
| 06 | The mode switch object selects tuning modes. | | | |
| IV | R/W | Type | Name | Context Function |
| C(43) | R/W | n | current_position | Description of received incoding mode. |
| n(6E) | R | n | number_positions | 4 (34h) |
| F(46) | R | n | list of switch positions | Default = (41h, 55h, 54h, 4Fh) |
| "41 55 54 4F 20 20 20" | 0 = AUTO | | | Automatic mode selection. |
| "4D 4F 4E 4F 20 20 20" | 1 = MONO | | | Mono audio |
| "53 54 45 52 4F 20 20" | 2 = STERO | | | Stereo audio |
| "53 41 50 20 20 20 20" | 3 = SAP | | | SAP audio (MTS) |

(07h) Receive Mode Object: Multi_State Sensor (0Ah)

|  |  |  |  | (0A) Multi-state |
|---|---|---|---|---|
|  | Receiving Mode Object | | | Sensor Object |
|  | The receiving mode object reports reception of any special incoding mode for the station or channel currently tuned. | | | |
| IV | R/W | Type | Name | Context Functions |
| C(43) | R | n | current_position | Description of received incoding mode. |
| n(6E) | R | | number_positions | 6 |
| F(46) | R | n | list of switch positions | Default = (4Eh, 4Fh, 4Eh, 45h) |
| "4E 4F 4E 45 20 20 20" | 0 = NONE | | | No Signal or carrier detected |
| "4D 4F 4E 4F 20 20 20" | 1 = MONO | | | Mono audio |
| "53 54 45 52 4F 20 20" | 2 = STERO | | | Stereo audio |
| "53 41 50 20 20 20 20" | 3 = SAP | | | SAP audio (MTS) |
| "53 41 50 4D 4F 4E 4F" | 4 = SAPMONO | | | SAP audio + Mono |
| "53 41 50 53 54 45 52 4F" | 5 = SAPSTERO | | | SAP audio + Stereo |

Video Display Context 13h
01 Context Control Context Control Object 02

|  | Context Control Object |  | (02) Context Control | |
|---|---|---|---|---|
| 01 | The context control object for Video Display Context. | | | |
| IV | R/W | Type | Name | Context Function |
| o (6F) | R | d | object_list "02 09" | list of objects used in context |

02 Source Switch Multi_position Switch Object 09

|  |  |  |  | (09) Multi_position |
|---|---|---|---|---|
|  | Source Switch Object | | | Switch Object |
| 02 | The source switch determines what signal is stored on the tape. | | | |
| IV | R/W | Type | Name | Context Function |
| C(43) | R/W | n | current_position | Default = 17 |
| n(6E) | R | | number_positions | 4 |
| F(46) | R/W | n | list of switch positions | Default = 9 |
| "4156 52 31 20 20 20 20" | 9 = AVR1 | | | AVR1 |
| "54 55 4E 45 52 31 20 20" | 17 = TUNER1 | | | Tuner 1 |
| "46 52 4F 4E 54 20 20 20" | 22 = FRONT | | | Front Panel |

Time Context 05

Time context provides for general time keeping and alarm functions. Can send a message when alarm occurs. Also provides a general programming capability tied to the time for maintaining timed programmed events.

Context Control Object

The Context Control Object for the Time context indicates the presence of the Real Time Object (02) and eight Program Timer Event Objects (03). The. eight Program Timer Events have Object numbers A0h to A7h. The object_list variable is given in Hex format where "h" denotes the end of a byte.

|  | Context Control Object |  | (02) Context Control | |
|---|---|---|---|---|
| 01 | The context control object for Time Context. | | | |
| IV | R/W | Type | Name | Context Function |
| o (6Fh) | R | d | object_list "02 1D 03 16 04 16 05 16 06 16 07 16 08 16 09 16 0A 16" | list of objects used in context |

Real Time Object

The Real Time Object holds time for the VCR timer.

The current_time variable "C" holds the present year, month,day, hour, minute, second and weekday. It is a composite of the hh_mm_ss, dd_mm_yy, and day_of_week lvs as found in the EIA 600 Clock Object (1Dh). The last character of current_time (day of week) is treated as a bit string: Bit $2^6$ indicates Sunday, $2^5$ Monday, . . . bit $2^0$ Saturday. All other entries are in ASCII.

The present year value is extended to four bits to allow for values above year 2000.

Example: Wednesay, Dec. 21, 2011, at 1:22:03 pm (13:12:03 hours ) is represented as
"32h, 30h, 31h, 31h,
31h, 32h,
32h, 31h,
31h, 33h,
31h, 32h,
30h, 33h,
08h"

The run_edit instant variable controls the clock run and edit functions: binary value for clock running (=1) or stopped/edit (=0). The clock can only be edited if run_edit=0.

| | Real Time Object | | | (1 Dh) Clock |
|---|---|---|---|---|
| 02 | The Real Time object keeps the current real time for the Time Context. | | | |
| IV | R/W | Type | Name | Context Function |
| r(72) | R/W | b | run_edit | T = run<br>0 = edit |
| C(43) | R/W | c | current_time (13) | current yy_mm_dd_hh_nn_ss_w |
| I(49) | R/W | n | time_source | (VCR VALUE = 0)<br>Possible Values:<br>0 = not a source<br>1 = DBS<br>2 = Satellite<br>3 = Set top Box<br>4 = TV |

Program Timer Event Objects

There are eight Event Timer class Objects in the VCR.

The current_status instant variable is used to determine the status of a program timer event object. When making an appointment, the requesting node uses the IF method along with the 00h wild card to determine which Event Timer class object has a current status=0, (30h). The event_data is conditionally set by the TRUE evaluation of current status=0. The remote_hc and remote_ua instant variable hold the requesting node's house code and unit address. They may be set separately but are generally obtained from the source address fields of the received packet.

The event_data contains all relevant information necessary to set up a recording event. The event_data may be cleared using the clear_event instant variable "c" (63h).

| | Program Timer Event Object | | | (16) Data Memory<br>Class Object |
|---|---|---|---|---|
| | Used to store timed events for the device containing this context. Each object instance stores one timer event. | | | |
| IV | R/W | Type | Name | Context Function |
| C(43)* | R(1) | n | current_status | 0 = not scheduled<br>1 = scheduled<br>2 = executing |
| h(68)* | R/W(4) | d | remote_hc | remote node house code |
| u(75)* | R/W(4) | d | remote_ua | remote node unit address |
| c(63)* | R/W | b | clear_event | set to 0 to clear event<br>set to 1 to disable clear<br>Default is 1 when event is unscheduled |
| p(70) | R/W | n | copy_protection | 30h = copy allowed<br>31h = analog copy allowed (no digital copy allowed)<br>32h = 1 analog copy allowed (no digital copy allowed)<br>33h = 1 digital copy allowed (analog copy allowed)<br>34h = no copies allowed<br>35h = unknown |
| m (6D) | R | n | timer_object_id | "30 33" hex = object 03h<br>"30 34" hex = object 04h<br>"30 35" hex = object 05h<br>"30 36" hex = object 06h<br>"30 37" hex = object 07h |

-continued

| | Program Timer Event Object | | | (16) Data Memory<br>Class Object |
|---|---|---|---|---|
| | Used to store timed events for the device containing this context. Each object instance stores one timer event. | | | |
| IV | R/W | Type | Name | Context Function |
| n (6E) | R | n | timer_number | "30 38" hex = object 08h<br>"30 39" hex = object 09h<br>"31 30" hex = object 0Ah<br>"30 31" hex = object 03h<br>"30 32" hex = object 04h<br>"30 33" hex = object 05h<br>"30 34" hex = object 06h<br>"30 35" hex = object 07h<br>"30 36" hex = object 08h<br>"30 37" hex = object 09h<br>"30 38" hex = object 0Ah |
| t(74) | R | d | event_conflict | timer_number values that conflict with scheduled event.<br>Is empty if there are no conflicts. Up to seven bytes long. |
| e(65)* | R/W | d | event_data | DnnnLnTnRIAM |
| D = start_event (4bytes) | | | | month (1st byte) = 01h-0Ch (1 12)<br>day (2nd byte) = 01h-1Fh (1–31)<br>hour (3rd byte) = 00h-18h (1–24)<br>minute (4th byte) = 00h-3Bh (0–59) |
| L = length_event (2 bytes) | | | | hours(5th byte) 00h-18h (1–24 hours)<br>minutes(6th byte) 00h-3Bh (0–59) |
| T = Tuner Channel (2 bytes) | | | | (7th & 8th bytes) 002h-3E7h (2–999) |
| R = Repeat Condition | | | | (9th byte)<br>00h = one time event;<br>01h = daily event;<br>02h = weekly event;<br>03h = monthly event;<br>04h = all weekday event (tapes all weekdays) |
| I = AV Source | | | | (10th byte)<br>26h = DAV (38);<br>09h = AVR 1 (9);<br>11h = Tuner 1 (17);<br>16h = Front Panel (22) |
| A = Audio | | | | (11th byte)<br>01h = Mono;<br>02h = Stero;<br>03h = Sap;<br>04h = Sapmono |
| R = Record Speed | | | | (12th byte)<br>04h = SP;<br>05h = SD;<br>06h = EP;<br>xx = Digital | note: event_conflict IV: This IV contains the timer_numbers of object that conflict with the event_data IV values stored in the Object and that do not have the same remote_ua and remote_hc IV values. The object assumes that Program Timer Event Objects with the same remote_ua and remote_hc IV values are from the same remote device and that the remote device detects its own conflicts.

Data Channel (DAV Bus) Context (04h)

01 Context Control: Context Control Object (02h)

| | Context Control Object | | | (02) Context Control |
|---|---|---|---|---|
| 01 | The context control object for DAV Bus Context. | | | |
| IV | R/W | Type | Name | Context Function |
| o (6Fh) | R | d | object_list | list of objects used in context<br>02 03 03 04 |

2E Dave Data Channel Receiver: Data Channel Receiver (03h)

| IV | DAV Bus Data Channel Receiver The TP channel receiver object for DAV Bus R/W | Type | Name | (03) Data Ch. Receiver Context. Context Function |
|---|---|---|---|---|
| m (6D) | R | n | medium | DAV = (8) "38h" |
| C (43) | R/W | d | current_channel | Current received channel number. "C" = 1 when receiving from bus. "C" = 0 when off the bus. |
| D (44) | R | d | default_channel | Default channel is "01h" |

2F Dave Data Channel Transmitter: Data Channel Transmitter(04h)

Data channel transmitter object establishes a transmitter connection to a data channel(s) on a specific medium. The medium for the transmitter is fixed by the product for a particular instance of this object. The transmitter gains permission to transmit on the desired channel or band. An error status is returned if the object is not capable of using the channel requested.

| 2E IV | DAV Bus Data Channel Transmitter The TP channel transmitter object for DAV Bus R/W | Type | Name | (03) Data Ch. Receiver Context. Context Function |
|---|---|---|---|---|
| m (6D) | R | n | medium | DAV = (8) "38h" |
| C (43) | R | d | current_channel | Current received channel number. C = 1 when inherits bus. Set = 0 when disinherits bus. |
| D (44) | R | d | default_channel | Default channel is "01h" |

What is claimed is:

1. A method of operating a video recording apparatus in one of a digital recording mode and an analog recording mode, the method comprising:
   a. receiving one of a digital video bit stream for recording in said digital recording mode and a corresponding analog video signal for recording in said analog recording mode;
   b. recording said digital video bit stream in said digital recording mode;
   c. detecting the presence of a fault condition of the video recording apparatus related to a selected recording mode in view of the received one of the digital video bit stream and the corresponding analog video signal; and
   d. switching to said analog recording mode for recording said corresponding analog video signal in response to the fault condition.

2. The method of claim 1 further comprising the step of indicating said fault condition to a user.

3. The method of claim 2 wherein said digital video bit stream includes copyright information and wherein said step of switching to said analog recording mode occurs in response to said copyright information.

4. The method of claim 3 wherein said step of switching to said analog recording mode occurs in response to receiving a user initiated command responsive to said indicated fault condition.

5. The method of claim 2 wherein said step of switching to said analog recording mode occurs in response to an analog recording media being loaded into the video recording apparatus.

6. The method of claim 5 wherein said step of switching to said analog recording mode occurs in response to receiving a user initiated command responsive to said indicated fault condition.

7. The method of claim 2 further comprising the step of canceling said digital recording in response to receiving a user initiated command responsive to said indicated fault condition.

8. The method of claim 1 wherein said step of switching to said analog recording mode occurs in response to said digital video bit stream being absent while said video recording apparatus operates in said digital recording mode.

9. The method of claim 1 wherein said recording apparatus is initialized to operate in a delay operating mode in response to a predetermined event for a second program, said recording apparatus pre-empting the recording of a first program to record the second program.

10. A method of error recovery for a video recording apparatus capable of recording in one of a digital recording mode and an analog recording mode, the method comprising:
   a. initializing the video recording apparatus to operate in a delay operating mode;
   b. receiving one of a digital video bit stream for recording in said digital recording mode and a corresponding analog video signal for recording in said analog recording mode;
   c. recording said digital video bit stream in said digital recording mode in response to first copyright information received from an electronic program guide; and
   d. switching to said analog recording mode for recording said corresponding analog video signal in response to second copyright information received in said digital video bit stream.

11. The method of claim 10 wherein said analog video signal and digital video bit stream are received from a receiver and further comprising the step of disabling the generation of said digital video bit stream so said recording apparatus only receives said corresponding analog video signal.

12. The method of claim 10 further comprising the step of indicating to a user that the event programmed in said delay operating mode may not be recorded because said first copyright information is not available.

13. The method of claim 11 wherein said step of recording is canceled in response to a user's indication that an analog recording is not desired.

14. The method of claim 13 further comprising the step of indicating to a user that said video recording apparatus is presently operating in a playback mode and that said digital video stream will not be recorded.

15. A method of operating a video recording apparatus in one of a digital recording mode and an analog recording mode, the method comprising:

a. receiving one of a digital video bit stream for recording in said digital recording mode and a corresponding analog video signal for recording in said analog recording mode;

b. selecting said digital recording mode;

c. detecting a status of said video recording apparatus, said status having one of no-fault condition and a fault condition of the video recording apparatus related to a selected recording mode in view of the received one of the digital video bit stream and the corresponding analog video signal;

d. recording said digital video bit stream in said digital recording mode in response to said no-fault condition; and e. switching from said digital recording mode to said analog recording mode for recording said corresponding analog video signal in response to said fault condition.

* * * * *